(12) United States Patent
Singh

(10) Patent No.: US 10,927,568 B2
(45) Date of Patent: Feb. 23, 2021

(54) STRIKE ASSEMBLY

(71) Applicant: Dormakaba Canada Inc., Quebec (CA)

(72) Inventor: Mandeep Singh, Ontario (CA)

(73) Assignee: Dormakaba Canada Inc., Quebec (CA)

( * ) Notice: Subject to any disclaimer, the term of this patent is extended or adjusted under 35 U.S.C. 154(b) by 224 days.

(21) Appl. No.: 16/057,032

(22) Filed: Aug. 7, 2018

(65) Prior Publication Data
US 2018/0347235 A1 Dec. 6, 2018

Related U.S. Application Data

(63) Continuation of application No. 14/436,396, filed as application No. PCT/CA2013/050768 on Oct. 10, 2013, now Pat. No. 10,072,441.
(Continued)

(51) Int. Cl.
*E05B 47/00* (2006.01)
*E05B 63/00* (2006.01)
(Continued)

(52) U.S. Cl.
CPC ...... *E05B 47/0047* (2013.01); *E05B 63/0056* (2013.01); *E05F 15/70* (2015.01); *G05B 15/02* (2013.01); *E05B 47/0012* (2013.01); *E05B 2047/0069* (2013.01); *Y10S 292/65* (2013.01); *Y10T 29/49826* (2015.01);
(Continued)

(58) Field of Classification Search
CPC ............. E05B 47/0047; E05B 63/0056; E05B 2047/0069; E05F 15/70; G05B 15/02; Y10T 29/49826; Y10T 292/68; Y10T 292/696; Y10T 292/699; Y10T 292/702;
(Continued)

(56) References Cited

U.S. PATENT DOCUMENTS 3,774,422 A * 11/1973 Hogan ................ E05B 47/0047
70/264
4,211,443 A 7/1980 Butts et al.
(Continued)

FOREIGN PATENT DOCUMENTS

| EP | 0084685 A1 | 8/1983 |
|---|---|---|
| JP | 2001119894 A * | 4/2001 |
| WO | 88/00633 A1 | 1/1988 |

*Primary Examiner* — Carlos Lugo
*Assistant Examiner* — Faria F Ahmad
(74) *Attorney, Agent, or Firm* — Baker & Hostetler LLP

(57) ABSTRACT

An electric strike assembly includes a housing formed with a recessed portion therein, a keeper assembly pivotably mounted in the recessed portion of the housing, a lock leg pivotably mounted in the recessed portion of the housing and configured to rotate independently of the rotation of the keeper assembly, a block assembly having a blocking element configured to engage and disengage the keeper assembly, and to control engagement and disengagement of the blocking element with the keeper assembly. A method of capturing and releasing a latch bolt mounted in a door includes mounting an electric strike assembly in an associated door jamb and controlling an actuator to rotate an, actuator paddle to engage a blocking element such that the blocking element is engaged or disengaged from a keeper assembly.

4 Claims, 17 Drawing Sheets

Related U.S. Application Data

(60) Provisional application No. 61/712,068, filed on Oct. 10, 2012, provisional application No. 61/737,450, filed on Dec. 14, 2012.

(51) Int. Cl.
  *E05F 15/70* (2015.01)
  *G05B 15/02* (2006.01)

(52) U.S. Cl.
  CPC .......... *Y10T 292/68* (2015.04); *Y10T 292/696* (2015.04); *Y10T 292/699* (2015.04); *Y10T 292/702* (2015.04); *Y10T 292/705* (2015.04); *Y10T 292/707* (2015.04)

(58) Field of Classification Search
  CPC . Y10T 292/705; Y10T 292/707; Y10S 292/65
  See application file for complete search history.

(56) References Cited

U.S. PATENT DOCUMENTS

| | | | |
|---|---|---|---|
| 5,474,342 A | 12/1995 | Smith et al. | |
| 5,484,180 A | 1/1996 | Helmar | |
| 5,735,559 A | 4/1998 | Frolov | |
| 5,757,269 A * | 5/1998 | Roth | E05B 45/083 |
| | | | 200/61.68 |
| 5,850,753 A * | 12/1998 | Varma | E05B 47/0047 |
| | | | 70/278.7 |
| 6,082,791 A | 7/2000 | Frolov et al. | |
| 6,874,830 B2 | 4/2005 | Bashford | |
| 6,913,299 B1 | 7/2005 | Stendal | |
| 7,722,097 B2 | 5/2010 | Schnarr et al. | |
| 7,770,949 B2 | 8/2010 | Kunda et al. | |
| 8,146,966 B1 | 4/2012 | Webb et al. | |
| 8,157,302 B1 | 4/2012 | Webb et al. | |
| 8,516,864 B2 | 8/2013 | Greiner et al. | |
| 8,720,959 B2 | 5/2014 | Wittke et al. | |
| 8,783,744 B2 * | 7/2014 | Scheffler | E05B 15/024 |
| | | | 292/341.18 |
| 8,807,606 B2 | 8/2014 | Ross et al. | |
| 8,833,814 B2 | 9/2014 | Chang | |
| 9,476,227 B2 * | 10/2016 | Scheffler | E05B 63/244 |
| 9,580,935 B2 * | 2/2017 | Singh | E05B 47/0047 |
| 9,617,755 B2 | 4/2017 | Peabody et al. | |
| 2003/0127870 A1 | 7/2003 | Schildwachter et al. | |
| 2005/0184539 A1 | 8/2005 | Milo | |
| 2006/0226663 A1 | 10/2006 | Liao | |
| 2007/0085354 A1 | 4/2007 | Hirschoff | |
| 2008/0224481 A1 | 9/2008 | Geringer et al. | |
| 2009/0072555 A1 | 3/2009 | Holzer | |
| 2010/0038920 A1 | 2/2010 | Tsai | |
| 2010/0078944 A1 | 4/2010 | Hirschoff | |
| 2010/0096864 A1 | 4/2010 | Webb et al. | |
| 2010/0116006 A1 | 5/2010 | Huang | |
| 2010/0127518 A1 | 5/2010 | Huang | |
| 2011/0031768 A1 | 2/2011 | Scheffler et al. | |
| 2013/0088023 A1 | 4/2013 | Singh | |

\* cited by examiner

STRIKE ASSEMBLY

CROSS-REFERENCE TO RELATED APPLICATIONS

This application is a continuation of U.S. application Ser. No. 14/436,396, filed Apr. 16, 2015, which claims priority to International Application No. PCT/CA2013/050768 filed on Oct. 10, 2013, which claims priority to U.S. provisional patent application Ser. No. 61/712,068 filed on Oct. 10, 2012 and U.S. provisional patent application Ser. No. 61/737,450, filed on Dec. 14, 2012, the disclosures of which are incorporated herein by reference in their entirety.

FIELD OF THE INVENTION

The present invention relates to door locking mechanisms, more particularly to door locking mechanisms known as electric strikes for mortise and cylindrical locks.

BACKGROUND OF THE INVENTION

Most homes and many commercial facilities rely on cylindrical locks or mortise locks to provide security at doorways and/or other access points. The dead latch is an essential component of these types of locks. For example, as shown in FIG. 1, a conventional cylindrical lock set 10 may include a latch 12 and dead latch 14, which is the small secondary piece located in front of the latch 12. The lock set 10 also includes typically a keyed knob or handle, for example, provided on the outside of a door and a knob or handle with a push button or twist lock, for example, provided on the inside, the knobs functioning to control the extension and/or retraction of the latch 12 and dead latch 14. The latch 12 and dead latch 14 are each configured to extend into and out from the cylindrical lock set 10, both being spring-loaded toward the extended position.

To use the lock set, a cavity is configured into a door jamb, or another door, for example, in specific alignment with the lock set 10 in order to receive the latch 12. A metal strike plate is typically mounted to the door jamb that guides the latch 12 into the cavity while providing increased strength to the door jamb around the cavity. The lock set 10 is installed in the door such that when the door is closed, the latch 12 and dead latch 14 are both depressed (i.e., retracted into the lock set) while passing over the strike plate until the latch 12 is received through a hole in the strike plate so that the latch 12 is permitted to extend into the cavity. It is critical that the alignment of the lock set 10 and the strike plate are such that when the latch 12 extends into the cavity when the door is closed, the dead latch 14 remains depressed by abutment against the strike plate. The lock set 10 is configured so that when the dead latch 14 is depressed while the latch 12 is fully extended, the latch 12 may not be depressed, preventing someone from using a credit card, for example, to push the latch 12 back from the outside when the door is closed and/or locked. Only use of the unlocked outside knob, for example, and/or the inside knob will allow the latch 12 to be retracted from the cavity into the lock set 10 so that the door may be opened.

As shown in FIG. 2, a conventional mortise lock set 20 may include a latch 22 and a dead latch 24. A handle 26 may be provided on the inside and a keyed lock cylinder 28 on the outside of the door. The latch 22 may be controlled via the handle 26 and/or a key inserted into the keyed lock cylinder 28. When the door is closed, the latch 22 is received into the cavity configured into the door jamb and/or strike plate. As noted above, the strike plate and cavity are configured so that latch 22 is received while the dead latch 24 remains depressed through abutment with a portion of the strike plate. Accordingly, the latch 22 may not be depressed from the outside by a credit card or other tool of the trade for gaining unwarranted access to a building or area. The latch 22 may only be released from the locked position and withdrawn into the lock set 20 via the inside handle 26 and/or a proper key inserted into the lock cylinder 28.

Electric strikes, also known as electric releases or electric release strikes, are part of a locking mechanism conventionally used to control access to buildings or areas, for example. Electric strikes may be used in conjunction with mortise and cylindrical lock sets. An electric strike is typically mounted into a door jamb and receives the latch and/or a dead bolt, for example. As shown in FIG. 3, a conventional electrical strike 30 normally requires a cut in the frame facing the door for mounting the strike. A pivotal keeper 32 in the electric strike may then be used to selectively close the opening in the frame face to prevent or allow release of the door's latch in order to lock the door or allow the door to be opened. When used with cylindrical or mortise type lock systems, the electric strike takes the place of the regular strike plate.

An opening and or cavity 34 for receiving the latch in electric strikes is often much bigger than provided by in the typical strike plate so that an electric strike may work with a variety of lock sets. Moreover, for use with a cylindrical lock set 10, for example, the keeper 32, which is usually only about ⅛" wide at the point where the latch is received, must be configured to catch the dead latch when the door is closed, preventing the dead latch from also falling into the cavity 34. The combination of the larger cavity 34 and the narrow keeper 32 that must receive the dead latch often make installation difficult in order to align everything precisely so as not to defeat the purpose of the dead latch and create situation where the lock can easily be breached.

There is a need and desire for an electric strike assembly having a configuration that can be easily installed into an existing door jamb, without the need to make an entirely new cut in the frame. The electric strike must also be configured to work with existing cylindrical and mortise type locks to ensure that the dead latch function remains viable once installed.

SUMMARY OF THE INVENTION

Embodiments of the present invention advantageously provide an electric strike assembly and methods of use thereof. In accordance with aspects of the present disclosure, an electric strike assembly includes a housing formed with a recessed portion therein, a keeper assembly pivotably mounted in the recessed portion of the housing, a lock leg pivotably mounted in the recessed portion of the housing and configured to rotate independently of the rotation of the keeper assembly, a block assembly having a blocking element configured to engage and disengage the keeper assembly, and to control engagement and disengagement of the blocking element with the keeper assembly.

In accordance with other aspects of the present disclosure, a method of capturing and releasing a latch bolt mounted in a door includes mounting an electric strike assembly in an associated door jamb, wherein the electric strike assembly includes a housing formed with a recessed portion therein, a keeper assembly pivotably mounted in the recessed portion of the housing, a lock leg pivotably mounted in the recessed portion of the housing and configured to rotate independently of the rotation of the keeper assembly, a block assembly having a blocking element configured to engage and disengage the keeper assembly, and an actuator having an actuator paddle configured to engage and disengage the blocking element, and controlling the actuator to rotate the actuator paddle to engage the blocking element such that the blocking element is engaged or disengaged from the keeper.

In accordance with yet other aspects of the present disclosure, an electric strike assembly includes a housing formed with a recessed portion therein, a door lever pivotally arranged in the recessed portion of the housing, a trigger rotatably mounted in the recessed portion, a latch release lever mounted in the recessed portion, a locking element, and a dead latch plate, wherein rotation of the door lever from an open position to a closed position simultaneously rotates the trigger and the latch release lever into a locked position held by the locking element.

There has thus been outlined, rather broadly, certain embodiments of the invention in order that the detailed description thereof may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The accompanying drawings, which are incorporated in and constitute a part of this specification, illustrate various embodiments consistent with the invention, and, together with the description, serve to explain the principles of the invention.

DETAILED DESCRIPTION

Figure 1:
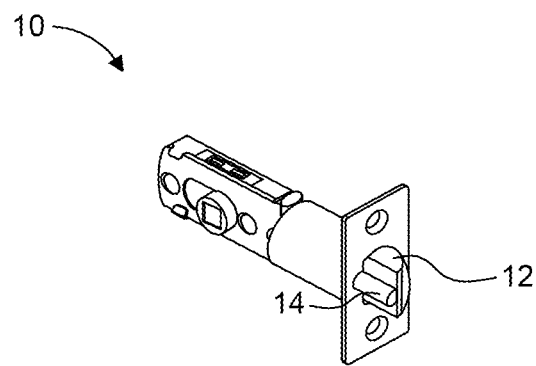
FIG. 1 is a perspective view of an exemplary cylindrical lock set, in accordance with certain aspects of the present disclosure.

The invention will now be described with reference to the drawing figures, in which like reference numerals refer to like parts throughout.

Various aspects of an electric strike assembly may be illustrated by describing components that are coupled, attached, and/or joined together. As used herein, the terms "coupled", "attached", and/or "joined" are used to indicate either a direct connection between two components or, where appropriate, an indirect connection to one another through intervening or intermediate components. In contrast, when a component is referred to as being "directly coupled", "directly attached", and/or "directly joined" to another component, there are no intervening elements present.

Relative terms such as "lower" or "bottom" and "upper" or "top" may be used herein to describe one element's relationship to another element illustrated in the drawings. It will be understood that relative terms are intended to encompass different orientations of an electric strike assembly in addition to the orientation depicted in the drawings. By way of example, if aspects of an electric strike assembly shown in the drawings are turned over, elements described as being on the "bottom" side of the other elements would then be oriented on the "top" side of the other elements. The term "bottom" can therefore encompass both an orientation of "bottom" and "top" depending on the particular orientation of the apparatus.

Various aspects of an electric strike assembly may be illustrated with reference to one or more exemplar embodiments. As used herein, the term "exemplary" means "serving as an example, instance, or illustration," and should not necessarily be construed as preferred or advantageous over other embodiments of an electric strike assembly disclosed herein.

Figure 4:
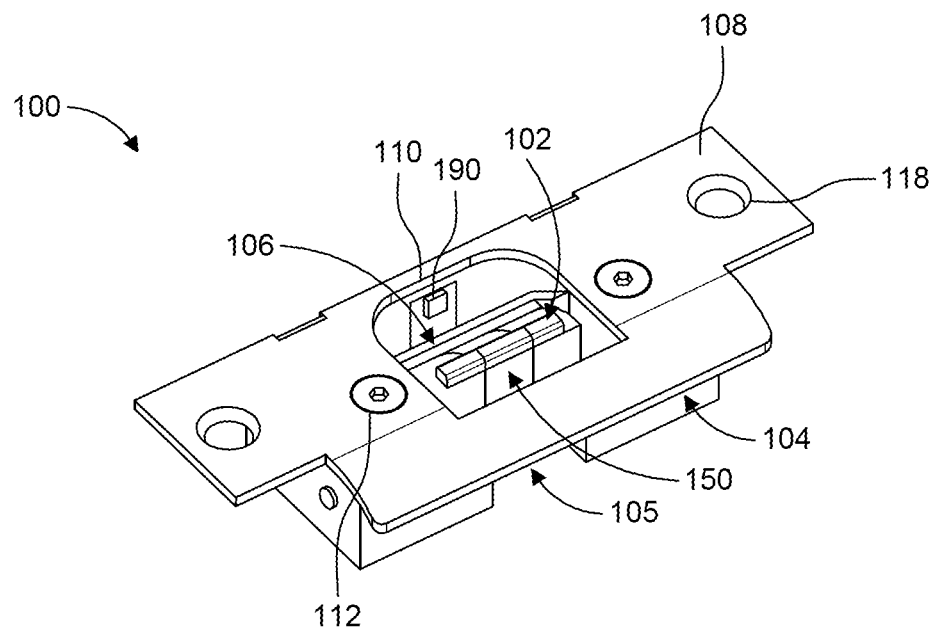
FIG. 4 is a front perspective view of an electric strike assembly, in accordance with certain aspects of the present disclosure.
Figure 5:
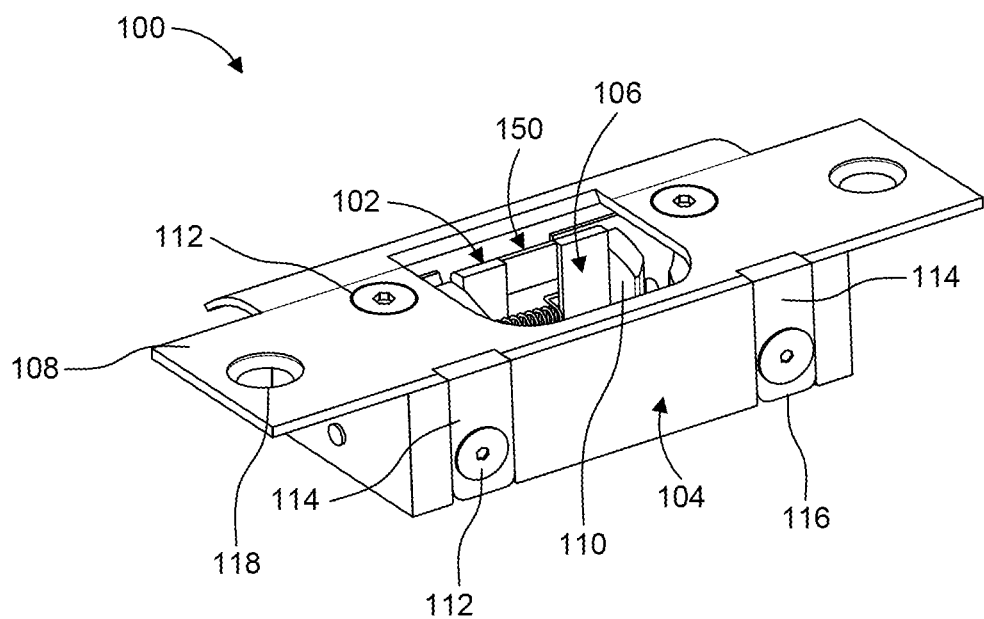
FIG. 5 is a rear perspective view of an electric strike assembly, in accordance with certain aspects of the present disclosure.

FIGS. 4 and 5 illustrate various views of an assembled electric strike assembly 100 for use with a cylindrical lock set in accordance with aspects of the present disclosure. The strike assembly 100 includes a keeper assembly 102 pivotally mounted in a housing 104. The keeper assembly 102 may be pivotable between a home position and a rotated position. In the home position (as shown in FIGS. 4 and 5), the keeper assembly 102 is prevented from moving, blocking release of the deadlatch and removal of the latch bolt from the strike, thus keeping the door in a locked state. In the rotated position (see FIG. 15), the keeper assembly 102 is allowed to pivot, permitting release of the deadlatch so the latch bolt can essentially push the keeper aside while retracting to allow the door to be opened.

As described in further detail infra, the housing 104 defines a strike cavity 106 in which may be mounted many of the individual components of the strike assembly 100, including the rotatable keeper assembly 102. A faceplate 108 having a latch opening 110 may be secured to the housing 104 using suitable attachment means, such as the countersunk head cap screws 112 illustrated in FIGS. 4 and 5. Mounting bars 114 may be provided that extend substantially perpendicular from a rear surface of the faceplate 108. The mounting bars 114 may be integrally formed with or mounted to the faceplate 108. In accordance with aspects of the present disclosure, the mounting bars 114 may be mounted to permit a certain degree of rotational flexibility. The flexibility of the mounting bars 114, in combination with the variable tightening of the cap screws 112, for example, may provide a certain degree of flexibility for the installer during mounting of the strike assembly 100 into a mortise already cut in a door jamb. In accordance with yet other aspects of the present disclosure, mounting slots 116 may be provided in a rear surface of the housing to securely seat the mourning bars 114. The configuration of various aspects of the strike assembly 100, along with a longitudinal maneuverability of aspects of the keeper assembly 102, as discussed in further detail below, are among the many features of electric strike assembly 100 that allow easy installation and/or replacement of the strike assembly 100 into existing door frames or door jambs, for example, with minimal or no additional cutting necessary.

In an exemplary configuration, the faceplate 108 may secure the electric strike assembly 100 to the door jamb by a suitable attachment device, such as screws, which may extend through holes 118 in the faceplate 108. Upon closing of the door, for example, the latch 12 and dead latch 14 of the cylindrical lock assembly 10 shown in FIG. 1 slide over and are compressed by the receiving lip portion of the faceplate 108 until being eventually received into the strike cavity 106. However, although the latch 12 may continue to slide past the keeper assembly 102 until it is able to fully extend into the strike cavity 106, the keeper assembly 102 is positioned so that a portion of the keeper assembly 102 prevents the dead latch 14 from also fully extending into the strike cavity 106. The latch 12 is thus captured in the strike cavity 106 and prevented from further lateral movement by the frame stop or the boundary of the latch opening 110 on one side and the keeper assembly 102 on the other. In this position, a lock leg 150 is positioned to prevent the dead latch 14 from also falling into the cavity 106. The door is thus prevented from being opened unless the latch 12 is retracted through use of an unlocked knob and/or the keeper assembly 102 is released as described below to allow extension of the dead latch 14 and thus retraction of the latch 12 and dead latch 14 assembly to open the door.

Figure 6:
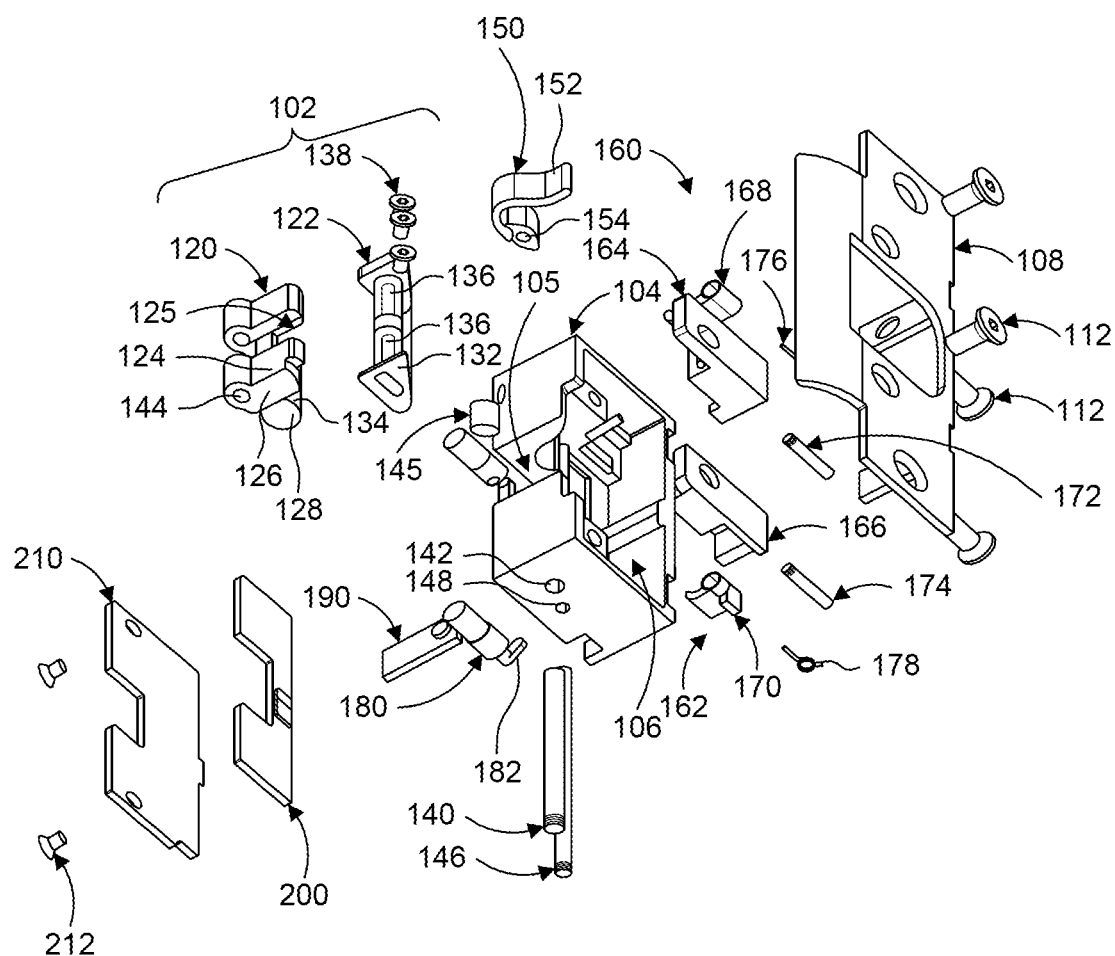
FIG. 6 is an exploded view illustrating various components of an electric strike assembly, in accordance with certain aspects of the present invention.
Figure 7:
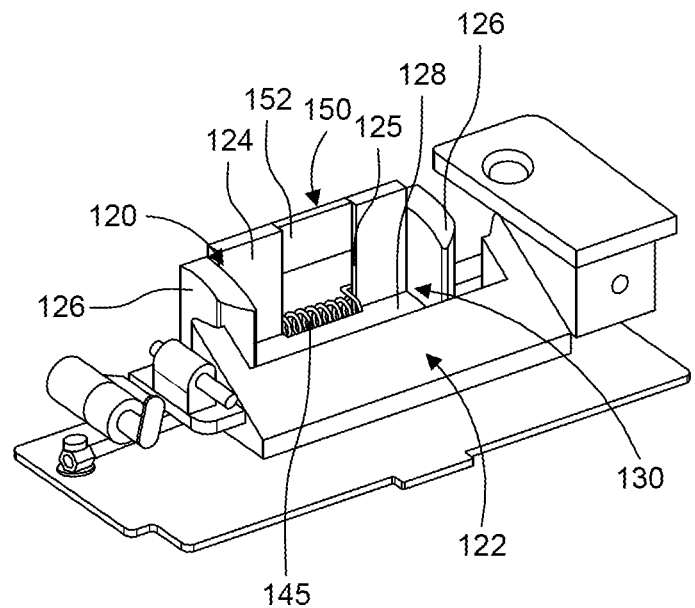
FIG. 7 is a rear perspective view illustrating various components of an electric strike assembly, in accordance with certain aspects of the present invention.

FIG. 6 is an exploded view of an exemplary strike assembly 100 to illustrate the general configuration of various component parts, in accordance with aspects of the present disclosure. The keeper assembly 102 may be a split keeper comprising a latch keeper portion 120 and a locking portion 122. The latch keeper portion 120 comprises a front keeper wall 124 and sidewalls 126 that rise substantially perpendicular to a base mounting plate 128. The front keeper wall 124 defines a central notch 125. The front keeper wall 124, sidewalls 126 and base mounting plate 128 combine to define a latch chamber 130 for receiving and effectively securing the latch 12 of the lock set 10 (see also FIGS. 7 and 8).

The locking portion 122 of the keeper assembly 102 may include a substantially hollow body portion 132 that is open on the downward facing side for receiving a mating portion 134 of the mounting plate 128. For example, the mating portion 134 may be a longitudinal protrusion formed at a distal end of the mounting plate 128 that is configured to extend into and slidably engage the pocket formed in the hollow body portion 132 of the locking portion 122. One or more slide channels 136 may be formed in the body portion 132. Flathead countersunk screws 138, or any other suitable attachment means, may be used to engage the mating portion 134 through the slide channels 136 in order to lock the latch keeper portion 120 to the locking portion 122 at a predetermined location along the longitudinal length of the locking portion 122.

As shown in FIG. 6, a keeper pin 140 may be mounted in the housing 104 with ends that are supported by through-holes 142 to provide a rotational axis for rotatably mounting the keeper assembly 102 in the strike cavity 106. Bosses with hole 144 may be formed in the latch keeper portion 120 to accommodate the keeper pin 140 therethrough. A keeper spring 145 may be provided so that the keeper assembly 102 is configured to rotate toward a closed position, as shown in FIGS. 4 and 5.

A lock leg pin 146 may be mounted in the housing 104 with ends that are supported by through-holes 148 to provide a rotational axis for rotatably mounting a lock leg 150. The lock leg 150 has a dead latch arm 152 and a rocker portion 154 and is mounted in the housing 104 to independently rotate about the lock leg pin 146 from that of the rotation of the keeper assembly 102 about the keeper pin 140. The lock leg 150 is mounted such that a distal end of the rocker portion 154 engages a portion of the base mounting plate 128 of the latch keeper portion 120 as the keeper assembly 102 rotates closed. The lock leg 150 is thus forced into and held in the closed position shown in FIG. 7, for example, when the keeper assembly 102 is in the home or closed position. In the home position, the dead latch arm 152 substantially fills the notch 125 in the front keeper wall 124. Thus, as the latch 12 passes over the front keeper wall 124 and extends into the latch chamber 130, the dead latch 14 will be prevented from similar extension by the dead latch arm 152 of the lock leg 150.

Referring back to FIG. 6, the housing 104 may be generally rectangular in shape and configured with various features, such as post extensions for receiving cap screws, internal walls or ribs for seating and/or bracing particular components, and/or bearing surfaces for supporting various rotational components of the assembly. A gap 105 in the front wall of the housing 104 may be provided to allow a certain expanded range of rotation for the lock leg 150 when all of the components are assembled. In addition to the keeper assembly 102 and the lock leg 150 described above, the housing 104 may also seat at least one block assembly, or as shown in FIG. 6, a left block assembly, generally shown at 160, and a right block assembly, generally shown at 162. The left and right block assemblies 160 and 162 respectively include a left block frame 164 and right block frame 166. The left and right block frames 164 and 166 are configured to rotatably support a left block 168 and a right block 170 a left block pin 172 and a right block pin 174. Left and right block springs, 176 and 178, respectively, provide a spring force to bias the blocks 168 and 170 into a position to engage or disengage the keeper assembly 102 to either allow or prevent the keeper assembly 102 from rotation.

At least one actuator 180, which may be a micro gear motor, for example, may be mounted via an actuator mount, which may be integrally formed with the housing 104. The actuator 180 may provide high-speed, high-power rotation to an actuator shaft on which an actuator paddle 182 may be provided. The actuator paddle 182 may be mounted on or integrally formed with the actuator shaft to actuate movement of the blocks 168 and 170 from either the open or closed position to the corresponding opposing closed or open position. A removable latch monitoring device 190, such as an infrared sensor, for example, may be mounted to a rear wall of the housing 104 to indicate whether a latch 12 is seated in the latch chamber 130. A printed circuit board 200 and other circuitry may be provided for controlling the strike assembly 100. A back cover plate 210 and suitable attachment devices 212 may be provided to enclose the bottom portion of the housing 104 while providing easy access to the internal components of the strike assembly 100 for maintenance and/or replacement of the various component parts if necessary. The housing 104 may be configured to fit into a mortise already provided in the door jamb or a mortise may be formed to accept the housing 104 so that the faceplate 108 aligns to receive the latch 12 of the lock set 10.

Figure 8:
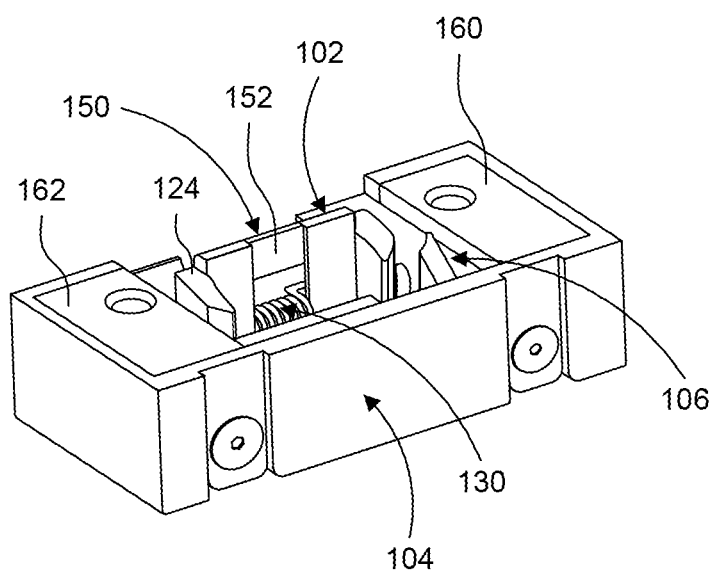
FIG. 8 is a rear perspective view illustrating an exemplary configuration of various components of an electric strike assembly, in accordance with certain aspects of the present invention.
Figure 9:
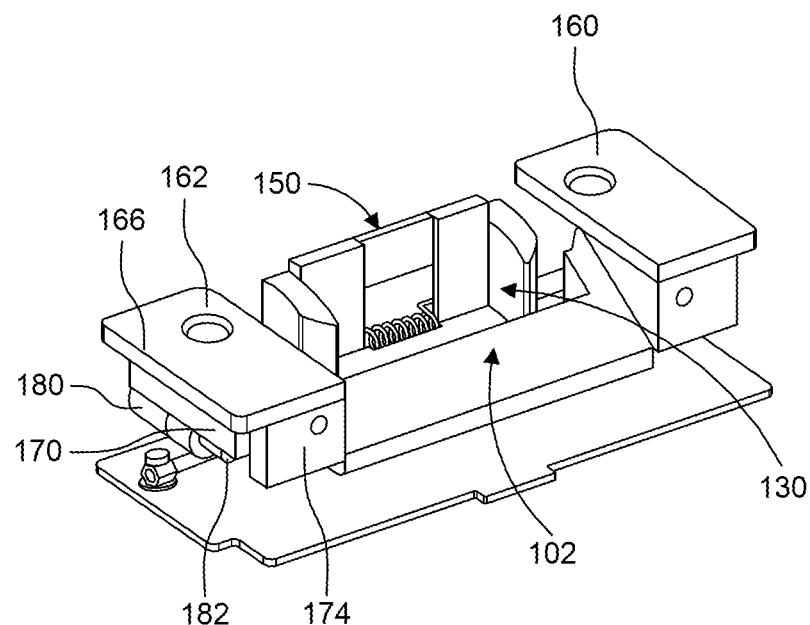
FIG. 9 is a rear perspective view illustrating an exemplary configuration of various components of an electric strike assembly, in accordance with certain aspects of the present invention.
Figure 10:
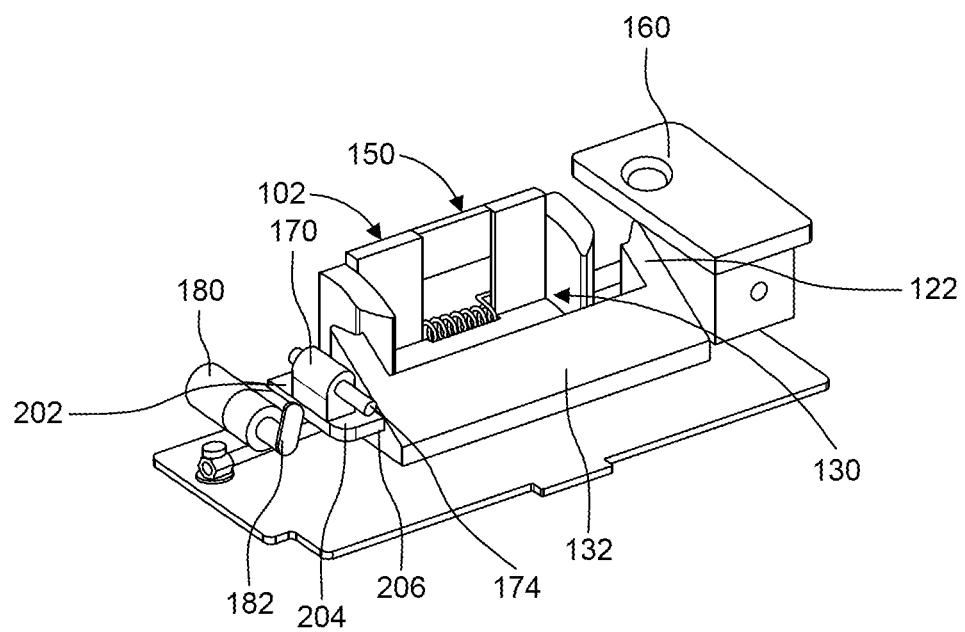
FIG. 10 is a rear perspective view illustrating an exemplary configuration of various components of an electric strike assembly, in accordance with certain aspects of the present invention.

To illustrate further the configuration of the strike assembly 100, FIGS. 8-10 show the strike assembly 100 in various states of assembly. FIG. 8 illustrates the strike assembly 100 with the faceplate 108 removed. As shown, the left block assembly 160 and the right block assembly 162 are seated in the housing 104 at the respective longitudinal ends of the strike cavity 106. The keeper assembly 102, shown in a closed position, is rotatably seated in the housing between the block assemblies 160 and 162 with the front keeper wall 124 and the dead latch arm 152 aligned to form a substantially enclosed latch chamber 130. FIG. 9 illustrates various internal components of the strike assembly 100 with the housing 104 removed in accordance with aspects of the present invention. For example, as shown with respect to the right side of the strike assembly 100, the right block frame 166 may be formed to enable the actuator 180, for example, which includes a paddle 182, to rotationally engage the right block 170. The right block frame 166 supports the right block pin 174, which rotationally mounts the right block 170.

FIG. 10 illustrates the strike assembly 100 in a closed position with the housing 104 and the right block frame 166 removed to further illustrate the function of the strike assembly 100. As shown in FIG. 10, the right block 170 has a pivot arm 202 and a locking arm 204. Although described herein with respect to the right side components, the same features may be configured with respect to the left side components. In the position shown in FIG. 10, the right block 170 is urged by the right block spring (not shown) so that the locking arm 204 engages a locking notch 206 provided in the hollow body portion 132 of the locking portion 122. With the locking arm 204 thus engaged in the locking notch 206, rotation of the keeper assembly 102 is prevented.

As described above, with the electric strike 100 mounted into a door jamb and the door ajar, the keeper assembly may be maintained in the closed position, as shown in FIGS. 7-10. In this position, when the door is closing, the door makes contact with the faceplate 108 until the latch 12 and dead latch 14 are compressed. Continued closing of the door results in the latch 12 falling into the latch chamber 130 while the dead latch is maintained in the compressed position by the dead latch arm 152 of the lock leg 150. With the door thus closed and the electric strike in the locked position as shown in FIG. 10, the locking arms 204 of the blocks 168 and 170 are engaged in the locking notches 206 of the keeper assembly 102 to prevent rotation of the keeper assembly 102. The keeper assembly 102 is maintained in that position by the force exerted by the block springs 176 and 178 preventing rotation of the keeper assembly 102.

Figure 11:
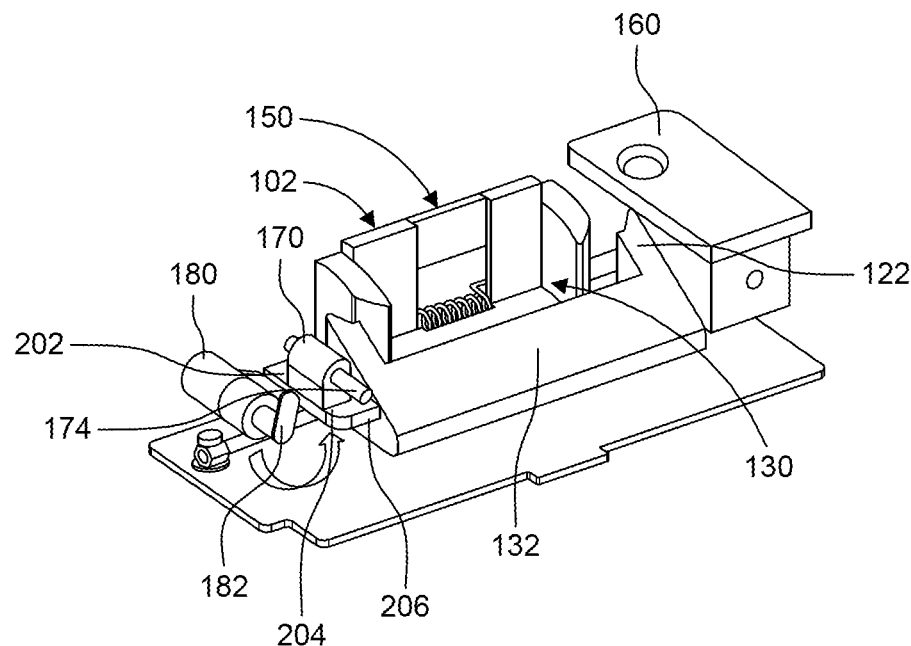
FIG. 11 is a rear perspective view of various components of an electric strike assembly in a certain position of use, in accordance with certain aspects of the present invention.

To open the door, a signal may be sent to the actuator 180 to rotate the paddle 182. With the actuator paddle 182 in a position ready to engage the pivot arm 202, as shown in FIG. 10, the block 170 may move from the locked home position to an unlocked position and vice-versa via rotation of the paddle 182. The paddle 182 may be rotated by the actuator 180, counterclockwise, as shown in FIG. 11 for example, so that the paddle 182 engages the pivot 202 to exert a rotational force on the block 170 until the force of the actuator 180 overcomes the return force of the block spring 176, the block 170 rotates, and the locking arm 204 is released from the locking notch 206 of the keeper assembly 102.

Figure 12:
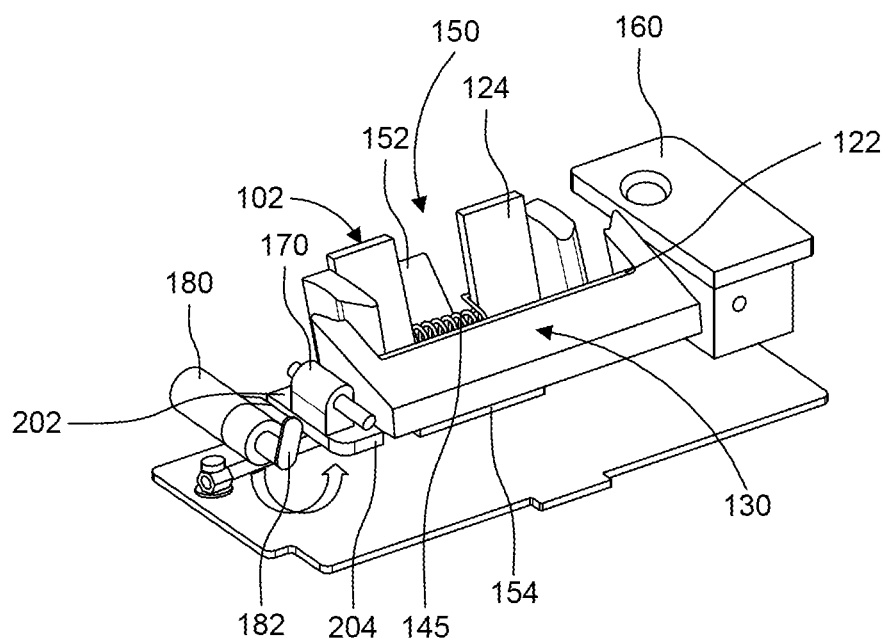
FIG. 12 is a rear perspective view of various components of an electric strike assembly in a certain position of use, in accordance with certain aspects of the present invention.
Figure 13:
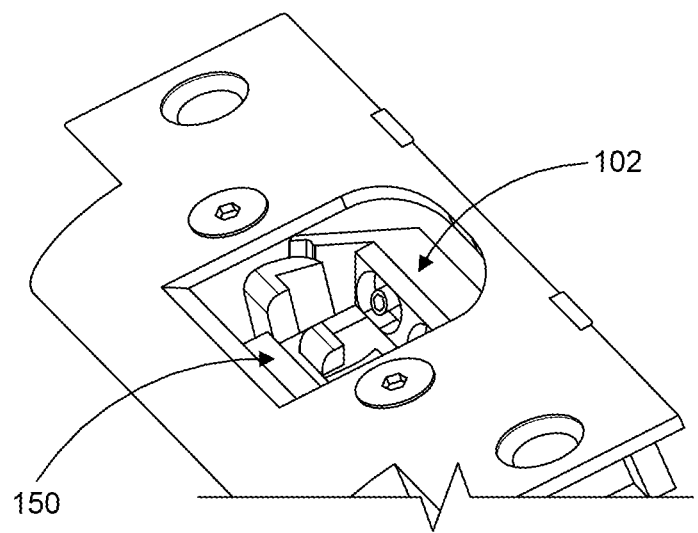
FIG. 13 a front perspective view of various components of an electric strike assembly in a certain position of use, in accordance with certain aspects of the present invention.
Figure 14:
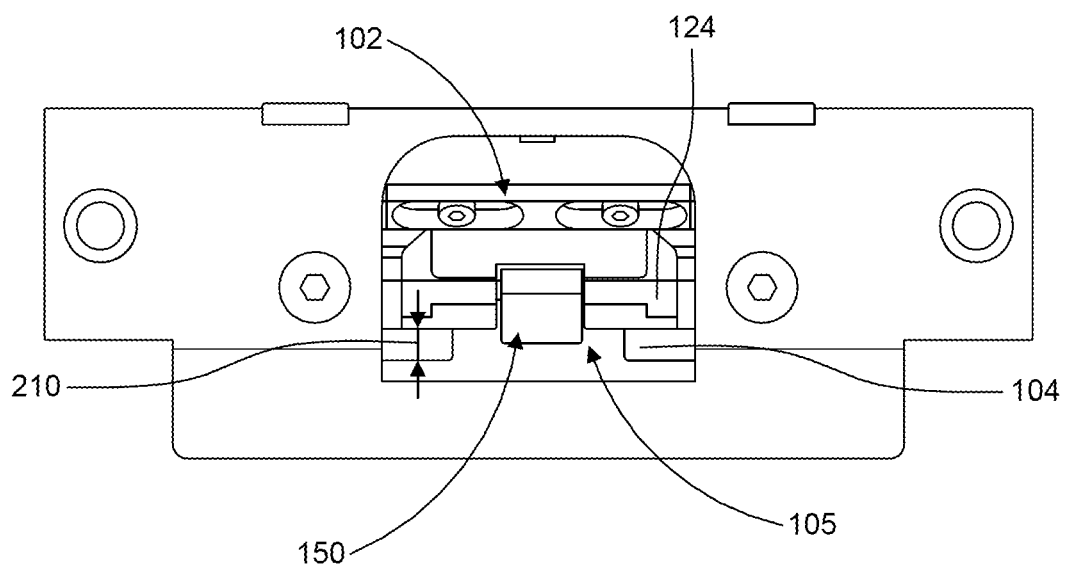
FIG. 14 a top perspective view of various components of an electric strike assembly in a certain position of use, in accordance with certain aspects of the present invention.

As shown in FIGS. 12-14, with the keeper assembly 102 thus free to pivot about the keeper pin 140, application of force against the door will force the latch 12 against the keeper wall 124 and cause the keeper assembly 102 to begin rotating against the biasing force of the keeper spring 145 toward an open position. As the keeper assembly 102 begins to rotate, the distal end of the rocker portion 154 of the lock leg 150 is released from being held in place by the latch keeper portion 120 of the keeper assembly 102. The lock leg 150 is thus free to rotate independent of the rotation of the keeper assembly 102. Accordingly, the force of the dead latch 14 will exert downward pressure against the partially rotated dead latch arm 152, rotating the lock leg 154 until the dead latch is fully extended, releasing the latch 12 and the dead latch 14 to retract. As shown in FIG. 14, the gap 105 in the housing 104 provides space for the dead latch arm 152 to rotate without restriction.

Figure 15:
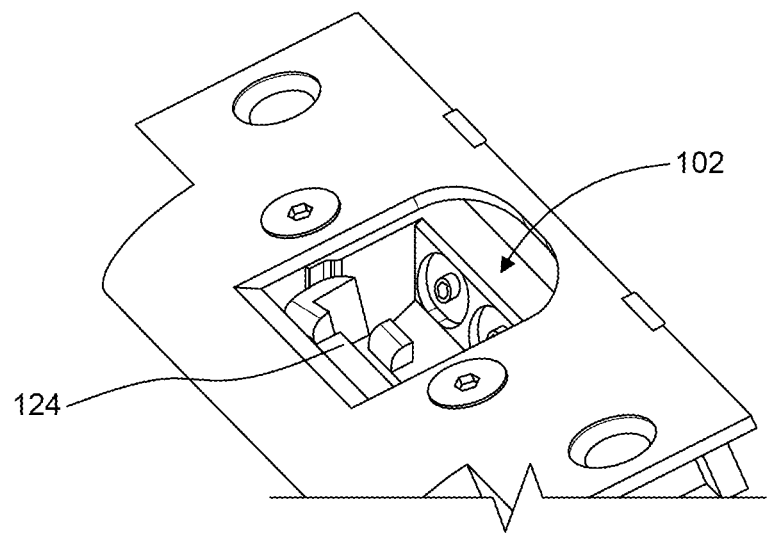
FIG. 15 a front perspective view showing various components of an electric strike assembly in a certain position of use, in accordance with certain aspects of the present invention.

The keeper assembly 102, on the other hand, will only rotate through a rotation gap 210 defined as the distance between the front keeper wall 124 and the housing 104. As shown in FIG. 15, full rotation of the keeper assembly 102 provides for a ramp to be defined by the front keeper wall 124. With the keeper assembly 102 thus rotated to its full extent, and the dead latch 14 released, the latch 12 may ride up the ramp (i.e., front keeper wall) and compressed into the lock body until the latch 12 and dead latch 14 are completely released from the strike assembly 100 with the door free to open.

Figure 16:
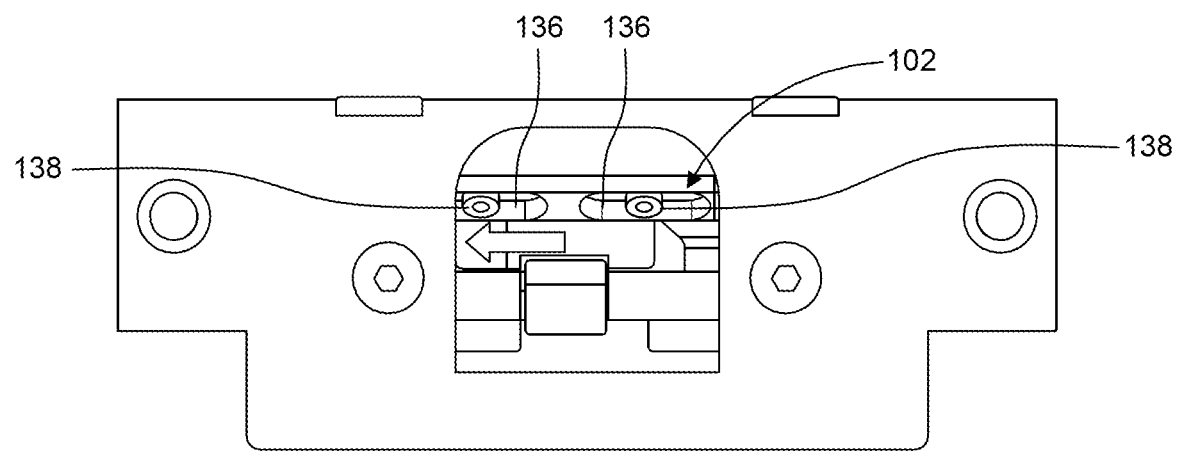
FIG. 16 a top perspective view of various components of an electric strike assembly to show the adjustability of a split keeper, in accordance with certain aspects of the present invention.

In accordance with other aspects of the present disclosure, FIG. 16 illustrates the adjustable nature of the keeper assembly 102. As described above, the one or more slide channels 136 and flathead countersunk screws 138 in the split keeper assembly 102 may be used to slidably adjust the latch keeper portion 120 with respect to the locking portion 122. In this manner, the latch chamber 130, along with the lock leg 150, may be adjusted to a predetermined height in the longitudinal cavity to accommodate the variability in the location of the lock set 10 in the door.

Figure 32:
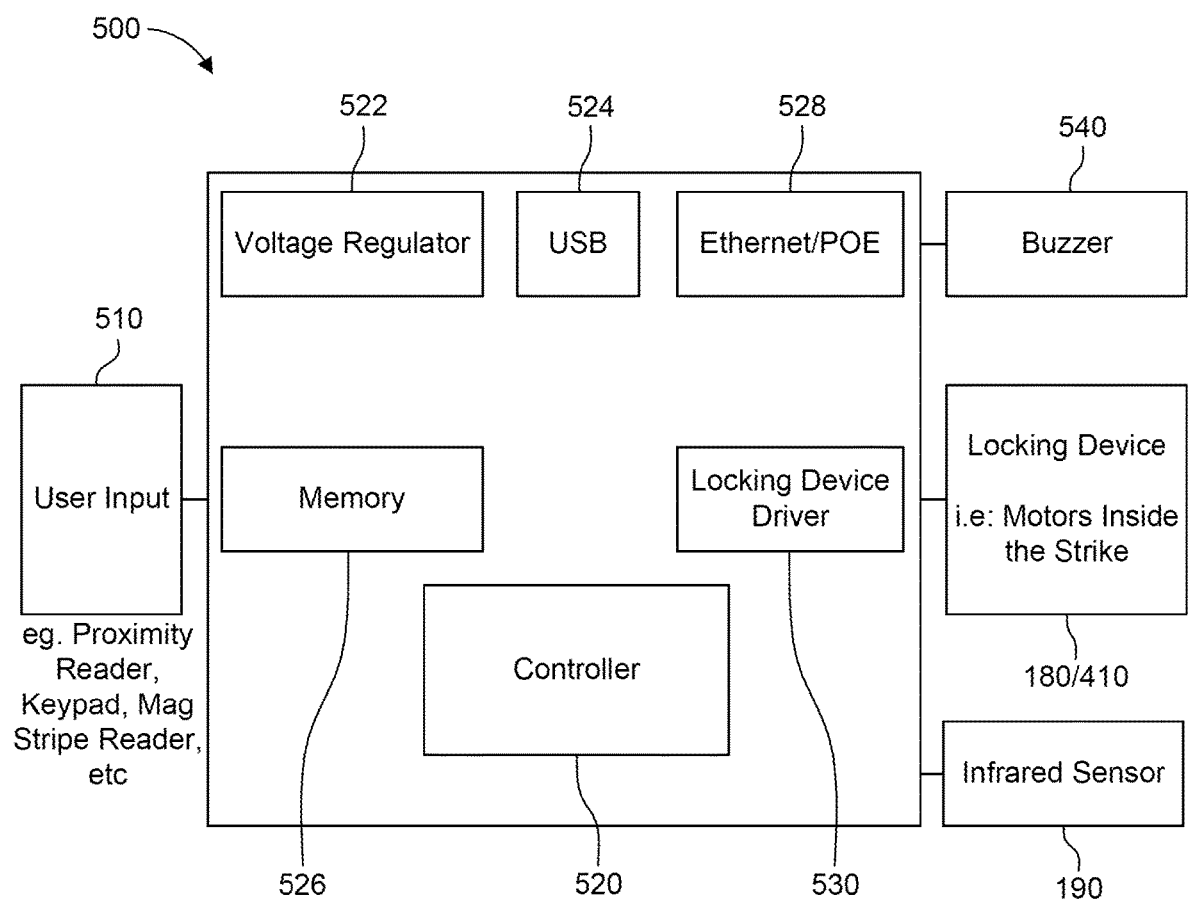
FIG. 32 illustrates a control system for an electric strike assembly, in accordance with certain aspects of the present invention.

The efficient design of the present invention allows for low power consumption, whereby the actuator 180 only draws power (e.g., 50 mA) during rotation of the actuator paddle 182. The strike assembly 100 may be designed to accept a very large input voltage range (4V-30V AC or DC) from a variety of power sources, including direct wiring the strike assembly 100 into a building's power supply. However, aspects of the present invention may also include a battery powered strike assembly. In yet other aspects of the present invention, power may be provided to the strike assembly via a Power over Ethernet (PoE) connection, in which power may be delivered via an Ethernet connection, simultaneously permitting monitoring, control, and audit capability of the users using or attempting to use the entrance/exit. For example, an embedded door controller 520 (see FIG. 32) may be provided with the strike assembly 100 that is activated by a user via a user interface, such as a Wiegand type interface with a card or access device reader, to permit the door to be opened. The door controller 520 may control the actuator 180 to a certain position, e.g., the home or closed position or a position in which the keeper assembly 102 is free to pivot.

Referring back to FIGS. 4 and 6, the removable latch monitoring device 190 may be provided to monitor the position of the latch bolt 12 in the latch chamber 130. The latch monitoring device 190 may be wired into an alarm panel, for example. In accordance with yet another aspect of the present invention, if the strike assembly 100 has an embedded door controller, the alarm function provided by the latch monitoring device 190 could be routed through the embedded controller. The latch monitoring device 190 may be a single removable component for easy maintenance, removal, and/or replacement in the field. The monitoring device 190 may be an infrared device for determining the presence and/or location of the latch bolt 12 in the chamber 130. The monitoring device 190 may be connected to the printed circuit board 200 and connected to, for example, a controller, an alarm circuit, a power supply, and/or ground. The latch monitoring device 190 may operate, for example, to identify when the door is closed and the latch bolt 12 is fully extended and retained by the keeper assembly 102. In accordance with other aspects of the present invention, the latch monitoring device 190 may include a latch bolt plate that is depressed when the door latch bolt is secured in the strike cavity 106, causing a cam or similar actuation device to activate a microswitch to send a signal to the remote monitoring device (e.g., alarm system or embedded controller) regarding the status of the door.

In accordance with yet other aspects of the present invention, when powered with alternating current (AC), the efficient, quiet nature of the strike assembly 100 may not alert a user to the unlocked/locked state of the door 10 during operation. A sound device or buzzer may be embedded in the strike and optionally connected to the controller, for example, to provide a selectable option of sound generation to indicate when the strike is being powered and the door is in a particular state.

Figure 17:
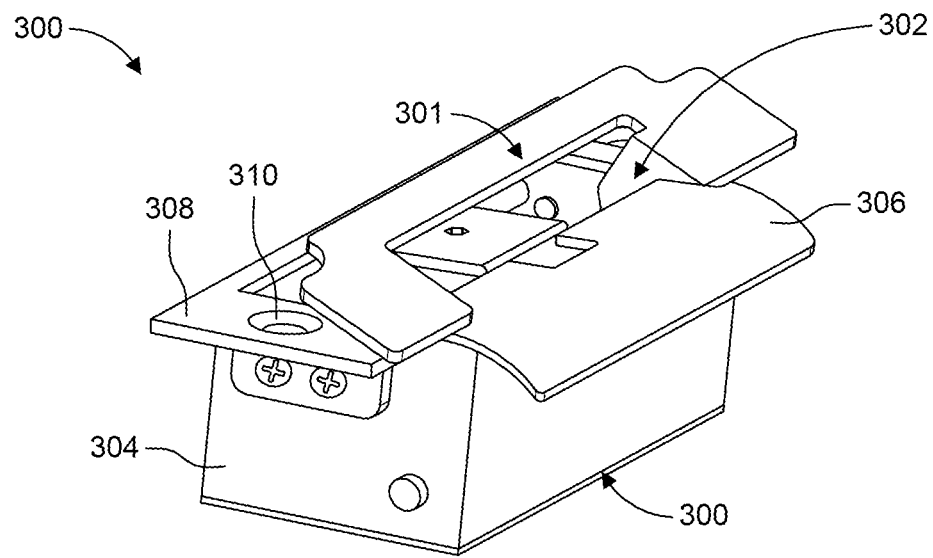
FIG. 17 is a perspective view of an electric strike assembly with a door lever in an open position, in accordance with certain aspects of the present invention.
Figure 18:
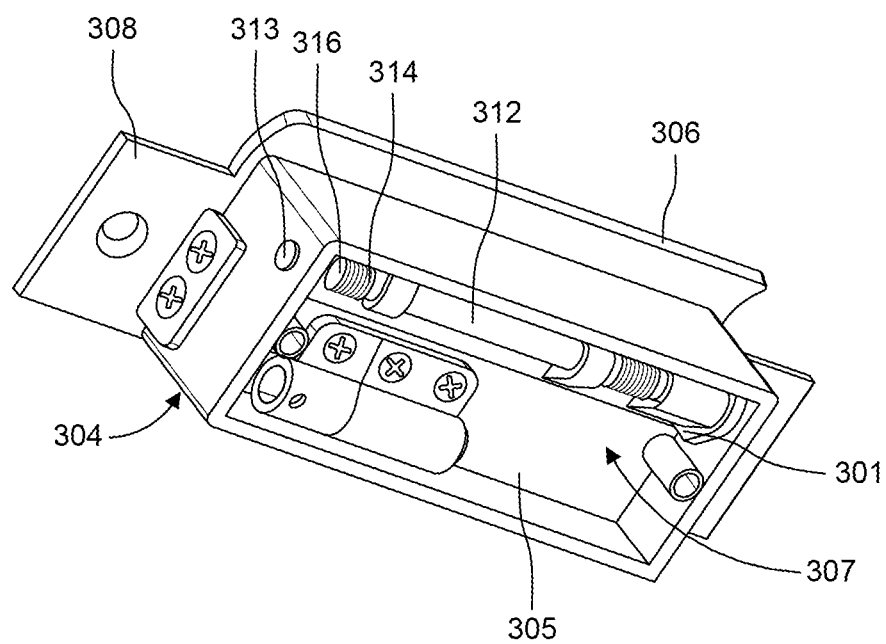
FIG. 18 is a bottom perspective view illustrating various components of an electric strike assembly, in accordance with certain aspects of the present invention.

FIGS. 17 and 18 illustrate an assembled electric strike assembly 300 in accordance with aspects of the present invention. The strike assembly 300 includes a door lever 301 pivotably mounted in a housing 311. The door lever 301 may be pivotable between an open position, as shown in FIG. 17, when the door is open and not engaging the strike assembly 300, and a closed position, when the door is closed and forcing the door lever 301 to rotate toward a recessed cavity 302 of the housing 311 (e.g., see FIG. 22). The housing 311 may be generally rectangular in shape and configured to be substantially closed on one side. A perimeter wall 304 may extend substantially around a periphery of the housing 311. As shown in FIG. 18, the housing 311 may include a floor plate 305 that substantially closes a portion of the housing in order to define the recessed cavity 302 on one side and a mounting cavity 307 on the other side. The housing 311 may be integrally formed with a strike plate 306 and/or mounting flanges 308 or a separate strike plate assembly including the strike plate 306 and mounting flanges 308 may be attached to the housing 311. The housing 311 may be configured to fit into a mortise already provided in the door jamb or a mortise may be formed to accept the housing 311 so that the strike plate 306 aligns to receive the latch 12 or 22 of the respective lock set 10 or 20. Recessed holes 310 may be provided in the mounting flanges 308 for receiving fastening mechanisms, such as wood or metal screws, for mounting the electric strike 300 into the door jamb.

As shown in FIGS. 17 and 18, the door lever 301 may be rotatably situated in the cavity 302 via mounting axle 312. The mounting axle 312 may be mounted in the housing 311 with ends that are supported by through-holes 313 in the perimeter wall 304. A door lever return spring 314 may be provided so that the door lever 301 is configured to rotate toward the open position as shown in FIG. 17.

Figure 19:
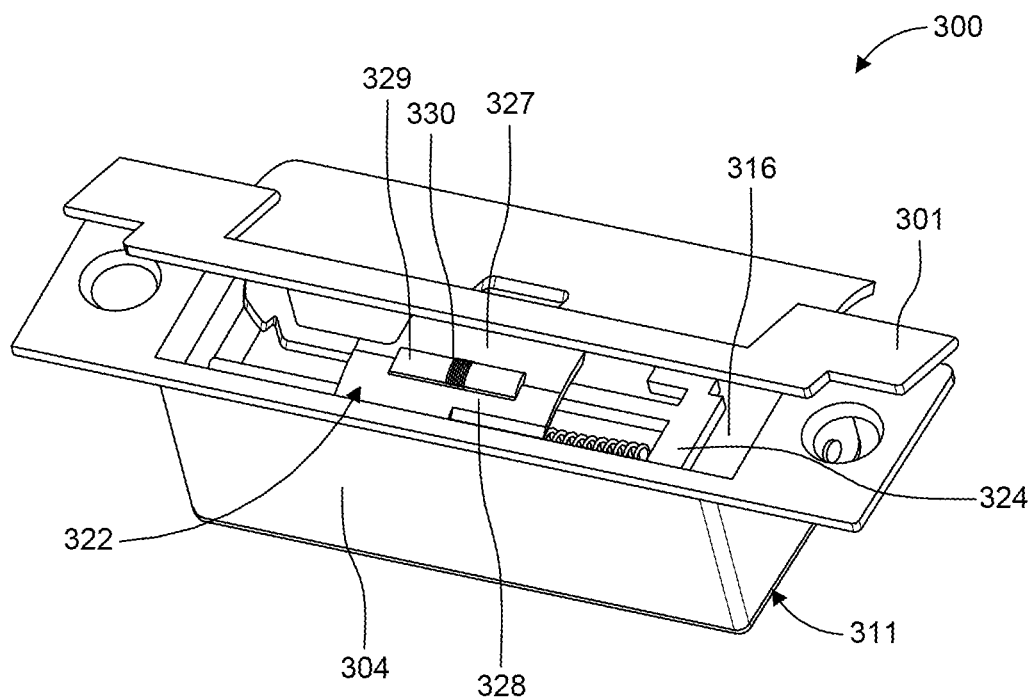
FIG. 19 is a top perspective view illustrating various components of an electric strike assembly, in accordance with certain aspects of the present invention.
Figure 20:
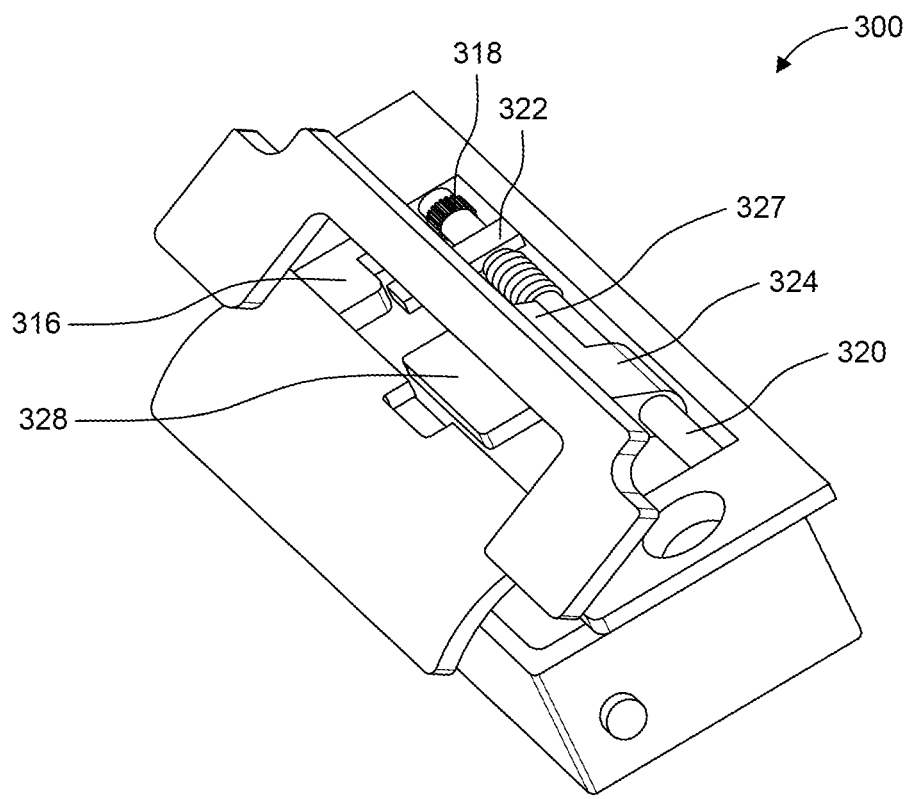
FIG. 20 is another top perspective view illustrating various components of an electric, strike assembly, in accordance with certain aspects of the present invention.
Figure 21:
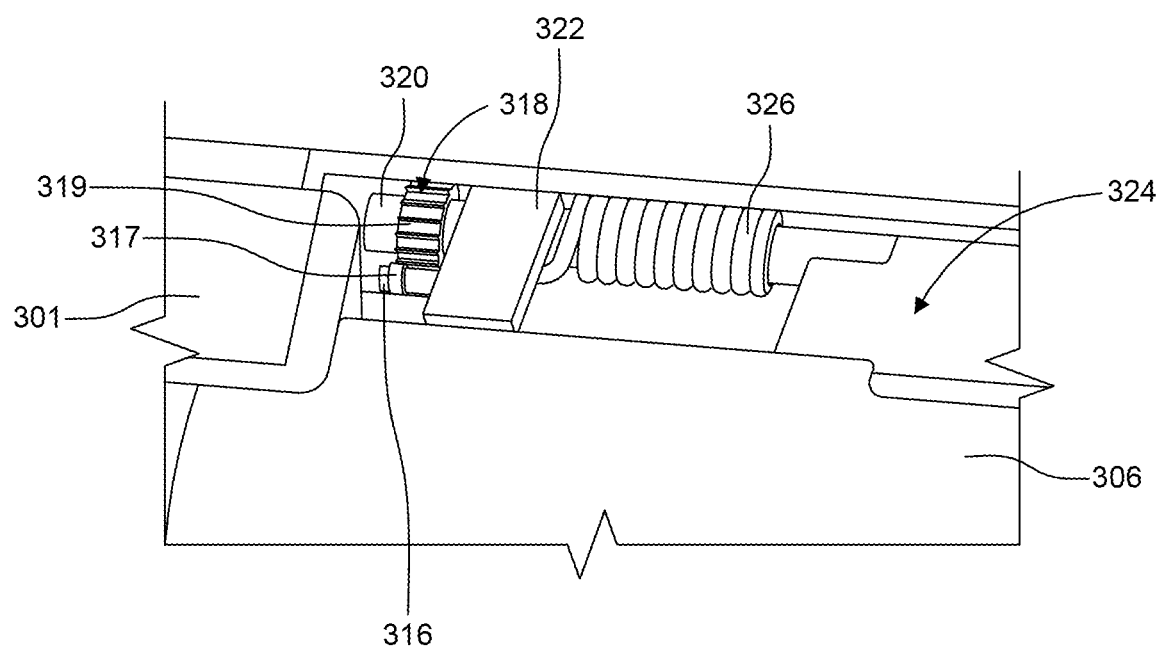
FIG. 21 is an enlarged perspective view of various components of an electric strike assembly, including a trigger and latch release lever, in accordance with certain aspects of the present invention.

As shown in FIGS. 19 and 20, a gear plate 316 may be provided that is attached to or integrally formed with the door lever 301. Thus, when the door lever 301 is pushed down with door closure, the gear plate 316 rotates as the door lever 301 pivots closed. As shown more clearly in the enlarged views of FIGS. 21 and 22, the gear plate 316 has a series of teeth 317 that mesh with radial gear teeth 319 on a gear 318. The gear 318 is mounted on a support shaft 320 and able to freely rotate about the support shaft 320. For example, the support shaft 320 may be configured as a flat bar having a longitudinal length, a transverse width and a certain thickness. The gear 318 may thus have an inside diameter greater than the transverse width of the support shaft 320 such that the gear 318 may freely rotate about the support shaft 320 while being supported on the support shaft 320. A bearing structure (not shown) may also be provided for mounting the gear 318 on the support shaft 320. A trigger 322 and latch release lever 324 are also each mounted on the support shaft 320. However, the trigger 322 and the latch release lever 324 are fixedly mounted onto the support shaft 320 so that rotation of the trigger 322, for example, forces simultaneous rotation of the support shaft 320 and the latch release lever 324. A trigger spring 326 may be mounted about the support shaft 320 to bias the trigger 322, for example, and thus the latch release lever 324, by way of the support shaft 320, into the position shown in FIG. 21. In accordance with aspects of the present invention, the latch release lever 324 may be positionally adjusted along the longitudinal length of the cavity 302. A suitable positioning device, such as a set screw, may be used to lock the latch release lever 324 at a predetermined longitudinal position on the support shaft 320 in the cavity 302. Thus, mortise lock sets having various latch locations may be easily accounted for through simple adjustment of the location of the latch release lever 324 at a corresponding position in the cavity 302.

Figure 22:
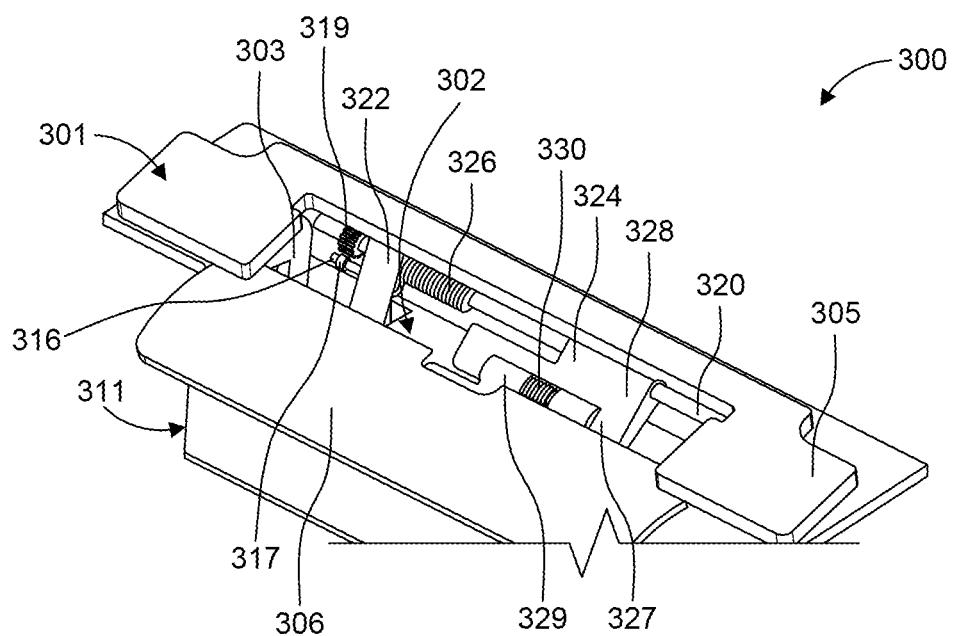
FIG. 22 is a top perspective view of an electric strike assembly, including a door lever in a certain position of use, in accordance with certain aspects of the present invention.

Referring back to FIG. 17, with the electric strike 300 mounted into a door jamb and the door ajar, the door lever 301 may be in an open position as shown. As shown in FIG. 22, when the door is closed, the door makes contact with the door lever 301, which is then forced to rotate toward the cavity 302. As the door lever 301 rotates toward the closed position, the series of teeth 317 on the gear plate 316 mesh with the radial gear teeth 319 on the gear 318 to rotate the gear 318. As shown in the close-up, view of FIGS. 23 and 23A, the gear 318 actually has two set of teeth, the radial gear teeth 319 extending from the circumferential periphery of the gear 318 and a second set of teeth 339 extending axially from a gear face 338 on a side facing the trigger 322. The second set of teeth 339 are shaped to mesh in ratcheting fashion with a set of trigger teeth 332 provided on the trigger 322. The trigger teeth 332 extend from a side face 333 of the trigger toward the gear 318. Thus, when the gear plate 316 rotates downward by way of the door lever 301 closing, the gear 318 rotates in a direction such that the second set of teeth 339 engage the trigger teeth 332 to rotate the trigger 322 in a direction down into the cavity 302 and away from the strike plate 306. Rotation of the trigger 322 in turn forces rotation of the support shaft 320 and thus rotation of the latch release lever 324 as well in a direction down into the cavity 302 and away from the strike plate 306.

In accordance with certain aspects of the present invention, the latch release lever 324 may be a two-piece, hinged assembly (see also FIG. 19). A distal portion 327 and proximal portion 328 may be configured to pivot about a hinge 329 so that when the latch release lever 324 is in the closed position, the distal portion 327 may lie substantially flat against a lower portion of the housing 311 while the proximal portion 328 may be positioned substantially parallel to a rear wall of the perimeter wall 304. A lever spring 330 may be provided to bias the distal portion 327 and the proximal portion 328 into a substantially planar configuration (e.g., see FIG. 20) when the latch release lever 322 is not rotated toward the closed position. In accordance with yet other aspects of the present invention, as shown in FIG. 22, the door lever 301 may be formed with pivot arms 303 and an abutment plate 305. The abutment plate 305 may be formed to substantially surround the cavity 302 when the door lever 301 is forced into a closed position, having a large central cutout portion so that the cavity 302 remains unblocked to receive the latch of the lock set when the door is closed and the door lever 301 rotated downward. Alone or in combination, the features described above ensure the cavity 302 essentially opens up to receive the latch of the lock set.

As the door closes against the door lever 301, the trigger 322 and the latch release lever 324 rotate further into the cavity 302, and the trigger spring 326 is wound and loaded with a spring force biased to snap the trigger 322 and latch release lever 324 back into the open position. FIG. 23 illustrates that the trigger 322 may have detent surfaces 323 formed to abut the perimeter wall 304 in a manner to prevent the trigger 322 from rotating open beyond a predetermined point, preferably the open position in which the door lever 301 is extended away from the strike plate 306 and the trigger 322 is situated substantially transverse across the opening of the cavity 302 and parallel to a top surface of the strike plate 306. Because the latch release lever 324 simultaneously rotates in reaction to any spring force exerted by the trigger spring 326, the latch release lever 324 may also be configured to have detent surfaces designed to prevent the assembly from rotating open beyond a predetermined point.

Figure 23A:
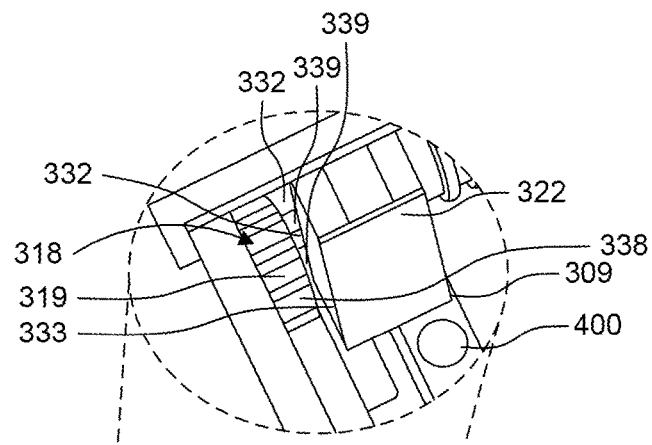
FIG. 23A is an enlarged view of elements of the electric strike assembly shown in FIG. 23 to illustrate engagement of a gear and trigger in accordance with certain aspects of the present invention.
Figure 23:
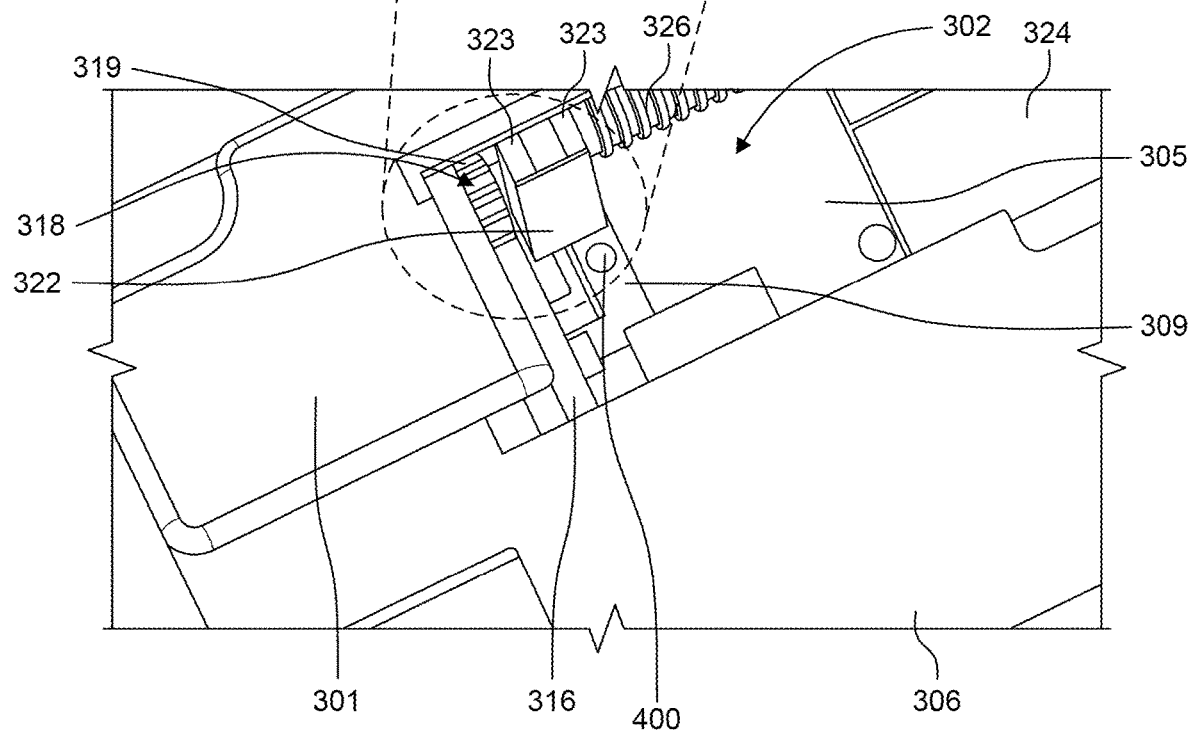
FIG. 23 is an enlarged perspective view of various components of an electric strike assembly, including a locking element in a certain position of use, in accordance with certain aspects of the present invention.
Figure 24:
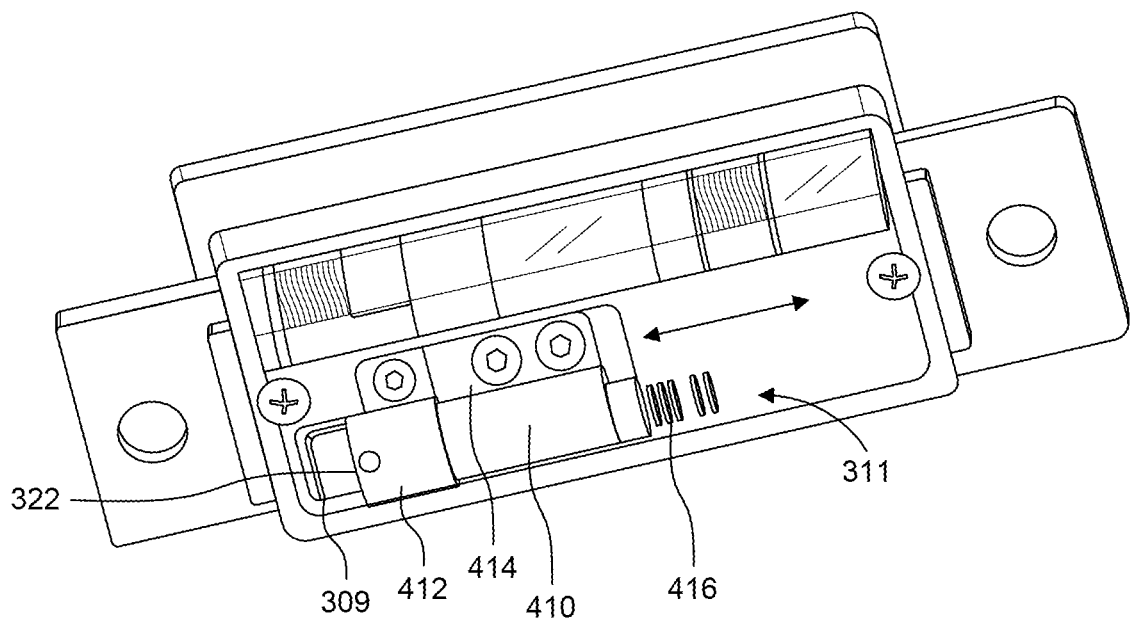
FIG. 24 is an enlarged perspective view of various components of an electric strike assembly, including a motor assembly, in accordance with certain aspects of the present invention.

When the trigger 322 is fully rotated or substantially rotated toward a locking position, as shown in FIGS. 23, 23A and 24, the distal end of the trigger 322 extends through an opening 309 in the floor plate 305. The trigger 322 rotates past a locking element 400 on its way to a fully closed position. The locking element 400 may be a protrusion, such as spring-loaded ball detent, for example, having a beveled surface on one side and a locking surface on the other side for holding a distal end of the trigger 322. Accordingly, as the trigger 322 rotates into a closed position, the locking element 400 may be temporarily displaced until the trigger 322 passes by, at which time the locking element 400 returns to a locking position and holds the trigger 322 in the closed position.

Figure 25:
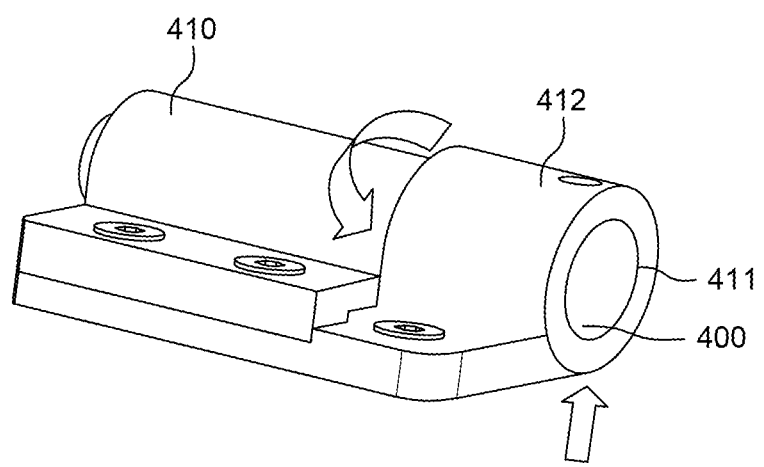
FIG. 25 a perspective view of a motor and mount assembly for use with an electric strike assembly, in accordance with certain aspects of the present invention.

As shown in FIG. 24, a motor assembly 410 may be mounted to a lower surface of the housing 311. The locking element 400 may be controlled by the motor assembly 410. For example, as shown in FIG. 25, the motor assembly 410 may rotatably control a cam element 411. The cam element 411 may be housed in a section of the motor mount 412 that also houses the locking element 400. The cam element 411 may be shaped so that for all but a portion of a 360° rotation, the cam element 411 will engage the locking element 400 to extend the locking element 400 beyond the motor mount 412 and into a locking position. As shown by the arrows in FIG. 25, however, when the cam element 411 rotates through a predetermined portion of the 360° rotation, the locking element 400 may be able to retract into the motor mount 41 to release the trigger 322.

Referring back to FIG. 24, the motor assembly 410 may include a slot 414 that permits the motor assembly 410 to be slidably mounted to the motor mount 412 and/or the housing 311. The motor assembly 410 may thus be slidably displaced back and forth via the slot 414 in a direction parallel to the longitudinal direction of the cavity 302. A motor spring 416 may be used to bias the motor assembly toward a home position that will place the locking element 400 into position for locking the trigger 322 when the door is closed. Thus, as described above, when the trigger 322 is rotated into a locking position, the locking element 400 may be displaced, along with the motor assembly 410, to allow the trigger 322 to pass. Once the trigger 322 is past the locking element 400, the motor spring 416 biases the motor assembly 410 back into the home position so that the locking element 400 moves back into a position to abut and hold the trigger 322 in the closed, locked position. Accordingly, the trigger 322 and the latch release lever 324 are locked in the closed position until the motor assembly 410 is actuated to rotate the cam element 411 through the predetermined portion of the 360° that allows the locking element 400 to retract into the motor mount 412 and away from the trigger 322, allowing the trigger 322 to release under the force of the trigger spring 326.

Figure 26:
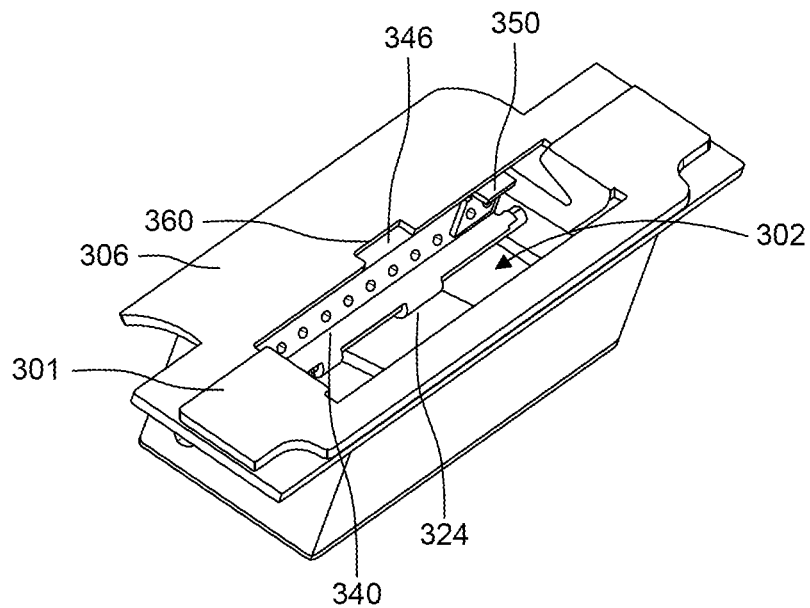
FIG. 26 is a top perspective view of an electric strike assembly, including a door lever in a certain position of use, in accordance with certain aspects of the present invention.
Figures 27, 28:
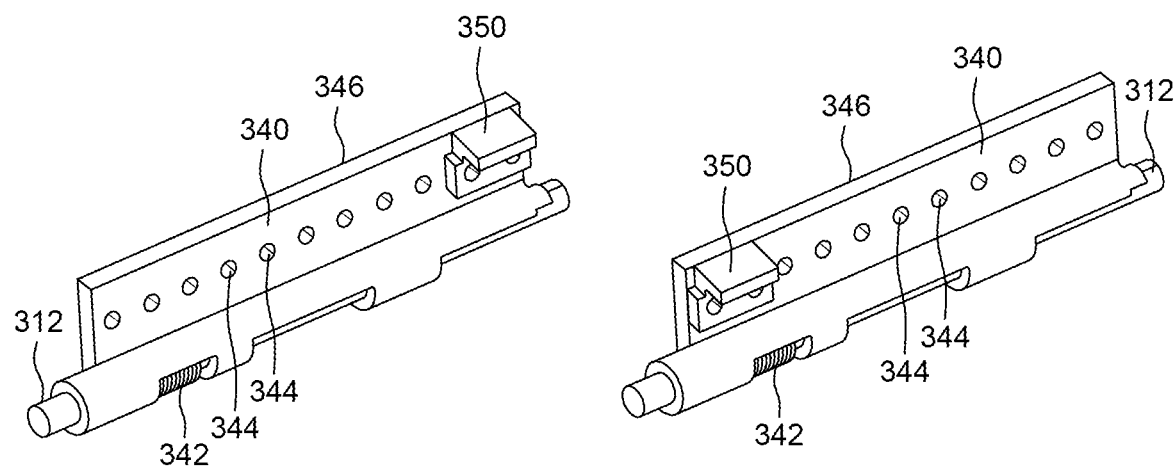
FIG. 27 illustrates a dead latch plate assembly with a mortise dead latch lever for use in an electric strike assembly, in accordance with certain aspects of the present invention.
FIG. 28 illustrates a dead latch plate assembly with a mortise dead latch lever for use in an electric strike assembly, in accordance with certain aspects of the present invention.

FIG. 26 illustrates a perspective view looking down into the cavity 302 when the latch release lever 324 and door lever 301 are in the closed position with the trigger 322 locked by the locking element 400 and held in place by the motor assembly 410. In this position, the door is essentially closed and the latch of the lock set has slid over the strike plate 306 to be received in the cavity 302. A dead latch plate 340 is shown rotatably mounted on the mounting axle 312 (see also FIGS. 27 and 28). A latch plate spring 342 may be provided to bias the dead latch plate 340 to be in a substantially perpendicular position with respect to an inner edge of the strike plate 306. A mortise dead latch lever 350 may be provided at a position on the dead latch plate 340 to align with the position of the dead latch when used with a mortise lock set. A series of mounting holes 344 may be provided in the dead latch plate 340 for mounting the mortise dead latch lever 350 with suitable mounting devices, such as screws, at the desired position. Thus, as shown in FIGS. 27 and 28, as with the latch release lever 324 described previously, the mortise dead latch lever 350 may be adjustable within the longitudinal dimensions of the cavity 302 to accommodate the various mortise lock sets that may be used in conjunction with the electric strike assembly 100.

Figure 2:
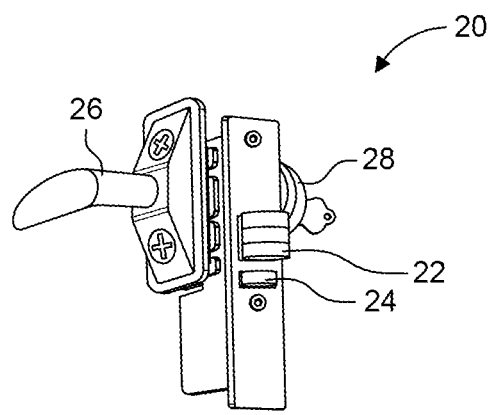
FIG. 2 is a perspective view of an exemplary mortise lock set, in accordance with certain aspects of the present invention.
Figure 3:
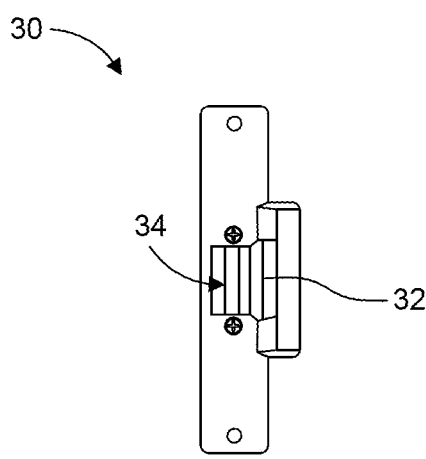
FIG. 3 is a perspective view of an electric strike, in accordance with certain aspects of the present disclosure.

As shown in FIG. 26, the strike plate 306 is configured with a dead latch notch 360. The dead latch plate 340 is normally positioned such that a top surface 346 of the dead latch plate 340 fills the cavity space below the dead latch notch 360. For a cylindrical lock set 10, as shown in FIG. 1, when the door closes and the latch 12 slides over the strike plate 306 and is received into the cavity 302, the top surface 346 of the dead latch plate 340 blocks the dead latch 14 from also extending into the cavity 302. Thus, with the door closed, the dead latch 14 is engaged to prevent tampering and the door is locked until disengaged as described below. Similarly, with a mortise lock set 20, as shown in FIG. 2, with the door closed, the mortise dead latch lever 350 prevents the mortise dead latch from extending into the cavity 302, preventing tampering and keeping the door in a locked position until disengaged as described below.

With the door closed and the electric strike in the locked position as shown in FIG. 26, to open the door, a signal may be sent to the motor to rotate the locking element 400 once, a full 360°. Referring back to FIGS. 23 and 23A, as the cam element 411 rotates through the predetermined portion of the 360°m the locking element 400 recedes into the motor mount 412 and the trigger 322 is released from the locked position. Due to the force of the trigger spring 326, the trigger 322 and latch release lever 324 shoot upward as the trigger spring 326 unwinds. Because the door lever 301 may remain closed at this stage of unlocking the door, the gear plate 316 and gear 318 are configured so that the gear 318 is disengaged from the gear plate 316 to spin freely along with the releasing trigger 322.

Figure 29:
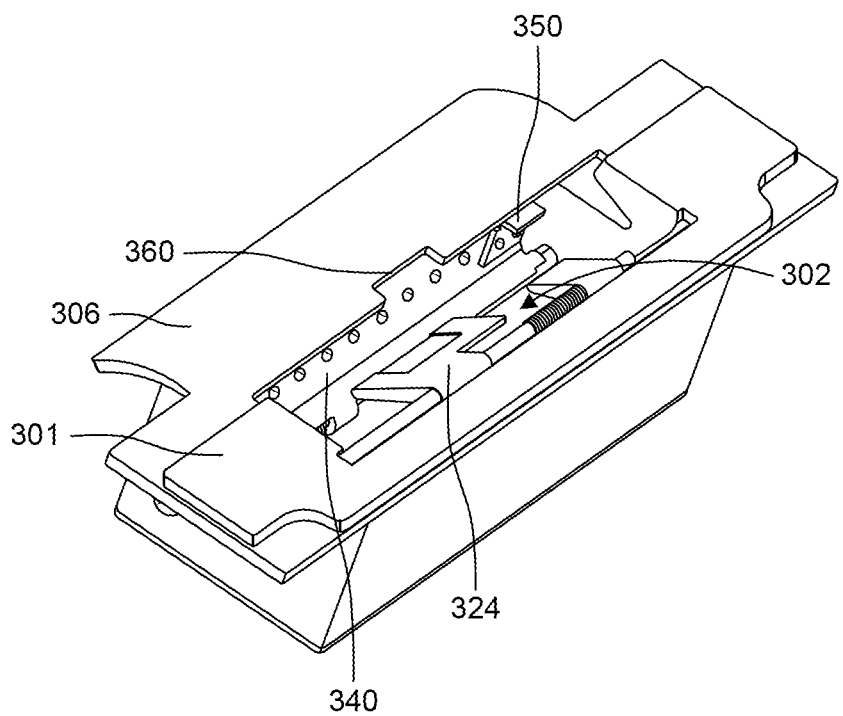
FIG. 29 illustrates the operation of an electric strike assembly, wherein various components of the electric strike assembly are shown in a certain position of use, in accordance with certain aspects of the present invention.
Figure 30:
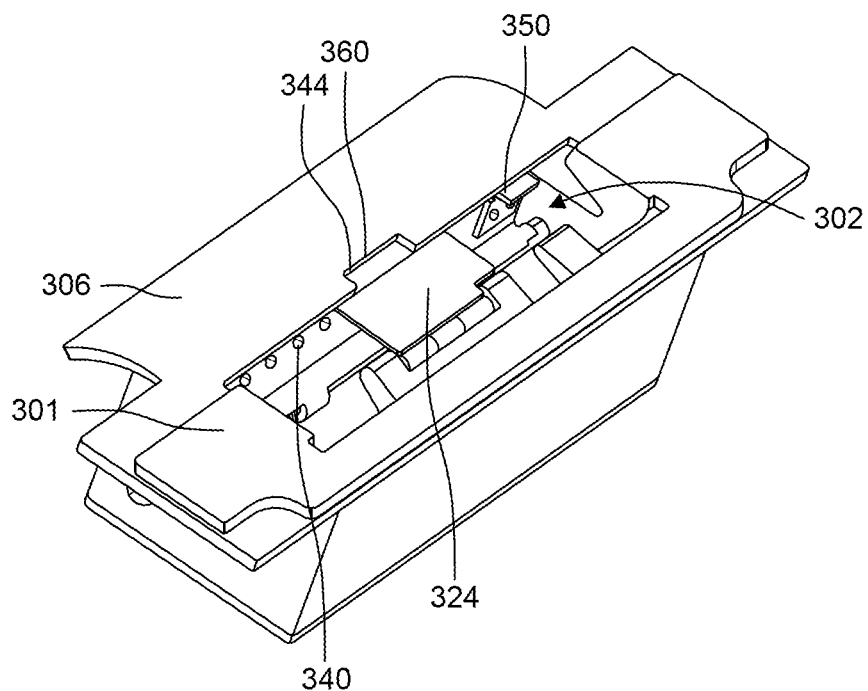
FIG. 30 illustrates the operation of an electric strike assembly, wherein various components of the electric strike assembly are shown in a certain position of use, in accordance with certain aspects of the present invention.
Figure 31:
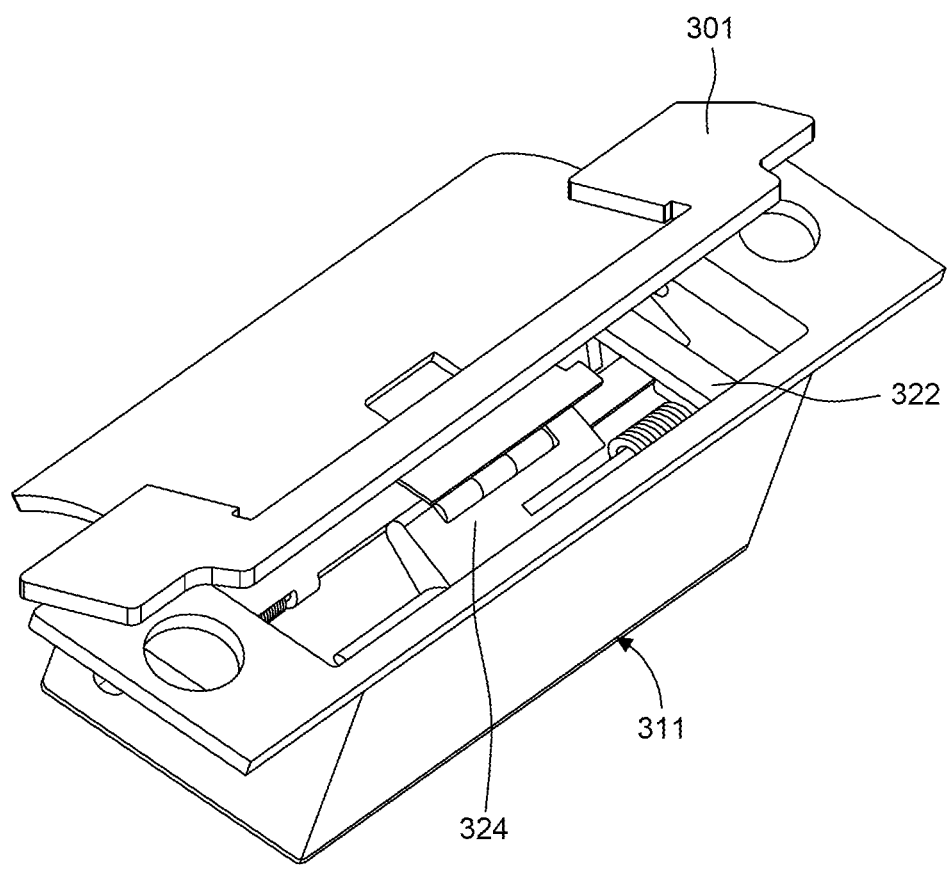
FIG. 31 illustrates the operation of an electric strike assembly, wherein various components of the electric strike assembly are shown in a certain position of use, in accordance with certain aspects of the present invention.

As shown in FIG. 29, during this upward rotation, the latch release lever 324 may be configured to impinge upon a portion of the dead latch plate 340. The interference of the latch release lever 324 with the dead latch plate 340 causes the dead latch plate 340 to rock forward. In the case of the cylindrical lock set 10, the movement of the dead latch plate 340 clears the top surface 346 from the dead latch notch 360 in the strike plate 306 so that the dead latch 14 is free to extend into the cavity 302. With the dead latch 14 thus freed, the latch 12 may now be fully retracted. As shown in FIG. 30, continued upward rotation of the latch release lever 324 forces full retraction of the latch 12 out of the cavity 302 so the door is free to open. In the case of the mortise lock set 20, the displacement of the dead latch plate 340 causes the mortise dead latch lever 350 to rock forward, releasing the dead latch 24 to extend into the cavity so the latch 22 is free to retract. Continued rotation of the latch release lever 324 forces the latch 22 to retract, allowing the door to open. As shown in FIG. 31, when the door is opened, the door lever 301 springs out. As the door lever 301 springs open, the teeth 317 on the gear plate 316 may engage the gear 318 to rotate in a direction opposite from that in which the second set of teeth 339 are designed to engage the trigger teeth 332. The ratcheting configuration of the second set of teeth 339 thus allows the door lever 301 to essentially be decoupled from the gear 318 while the door lever 301 opens and the electric strike assembly 300 is readied for reloading when the door is subsequently closed.

The efficient design of the present invention allows for low power consumption, whereby the motor assembly 410 only draws power during the single rotation of the cam element 411 and release of the locking element 400. The electric strike assembly 300 may be designed to accept a very large input voltage range (4V-30V AC or DC) from a variety of power sources, including direct wiring the strike assembly 100 into a building's power supply. However, aspects of the present invention may also include a battery powered strike assembly, wherein the batteries are contained directly in the strike assembly 300, such as in the cavity 302 of the housing 311 or on the lower side of the housing 311 mounting the motor assembly 410. In yet other aspects of the present invention, power may be provided to the strike assembly via a Power over Ethernet (PoE) connection, in which power may be delivered via an Ethernet connection, simultaneously permitting monitoring, control, and audit capability of the users using or attempting to use the entrance/exit. For example, an embedded door controller 520 (see FIG. 32) may be provided with the strike assembly 300 that is activated by a user via a user interface, such as a Wiegand type interface with a card or access device reader, to permit the door to be opened.

In accordance with yet other aspects of the present invention, when powered with alternating current (AC), the efficient, quiet nature of the strike assembly 100 may not alert a user to the unlocked/locked state of the door 10 during operation. A sound device or buzzer may be embedded in the strike and optionally connected to the controller, for example, to provide a selectable option of sound generation to indicate when the strike is being powered and the door is in a particular state.

FIG. 19 illustrates aspects of a control system 500 that may be provided separately or as an embedded feature of the strike assemblies 100 or 300, as described above. The control system 500 may include a user input 510, such as a WiGand type proximity reader, a keypad, or magnetic stripe reader. The user input 510 may be connected to a controller 520, which may be embedded directly into the strike assembly 100 or 300, via a wired connection or any other suitable connection, including a secured wireless connection, for example. The controller 520 may include or be configured to control a voltage regulator 522, a Universal Serial Bus (USB) connection 524, memory 526, an Ethernet connection 528, and a locking device driver 530 for controlling aspects of a sound device 540, the locking device (e.g., actuator 180 or motor assembly 410) and a monitoring device, for example. User access settings and other access data may be uploaded to the controller 520 via the Ethernet connection and/or the USS connection, allowing selective configuration of the controller directly and or remotely in order to control the access parameters of a particular entrance/exit. Based on the access parameters stored in the memory 526, for example, the controller may process the user input to determine whether to deactivate the locking device in order to unlock the strike assembly and permit passage through the door. The controller may be programmed and/or controlled to activate the sound device 540 and/or may receive status information from a monitoring device (e.g., infrared sensor 190) during or after operation of the strike assembly 100 or 300. For example, in the event that the door does not fully close following activation of the strike assembly 100 or 300, an alarm signal may be generated and sent via the Ethernet connection, for example, to provide notice as to the condition. A pressure sensor or other such monitoring devices may be incorporated into the electric strike assembly 100 or 300 to monitor the open or closed state of the door. Moreover, an audit trail of user access and/or the occurrence of alarm conditions, for example, may be stored and/or provided through the controller 520 and the control system 500.

The advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A method of capturing and releasing a latch bolt mounted in a door, the method comprising:
   mounting an electric strike assembly in an associated door jamb, the electric strike assembly comprising:
      a housing formed with a recessed portion therein;
      a keeper assembly pivotably mounted in the recessed portion of the housing;
      a lock leg pivotably mounted in the recessed portion of the housing and configured to rotate independently of the rotation of the keeper assembly;
      a block assembly having a blocking element configured to engage and disengage the keeper assembly; and
      an actuator having an actuator paddle configured to engage and disengage the blocking element; and
   controlling the actuator to rotate the actuator paddle to engage the blocking element such that the blocking element is engaged or disengaged from the keeper assembly.

2. The method of claim 1, wherein the keeper assembly includes a latch keeper portion that comprises a base mounting plate and the lock leg has a dead latch arm and a rocker portion, the method further comprising:
   mounting the lock leg in the housing such that a distal end of the rocker portion is engaged by the base mounting plate during rotation of the keeper assembly into a closed position.

3. The method of claim 2, further comprising:
   configuring the keeper assembly with a front keeper wall that defines a ramp for release of the latch bolt during maximum rotation of the keeper assembly away from the closed position.

4. The method of claim 1, further comprising:
   providing a controller activated by a user via a user interface to control actuation of the strike assembly between a locked state and an open state.

* * * * *